(12) United States Patent
Simon et al.

(10) Patent No.: US 8,410,236 B2
(45) Date of Patent: Apr. 2, 2013

(54) POLYCARBONATE AND/OR POLYURETHANE POLYORGANOSILOXANE COMPOUNDS

(75) Inventors: Walter Simon, Bochum (DE); Karl-Heinz Sockel, Leverkusen (DE); Gunnar Hoffmüller, Leverkusen (DE); Roland Wagner, Bonn (DE); Horst Lange, Bochum (DE)

(73) Assignee: Momentive Performance Matierals GmbH, Leverkusen (DE)

( * ) Notice: Subject to any disclaimer, the term of this patent is extended or adjusted under 35 U.S.C. 154(b) by 403 days.

(21) Appl. No.: 12/601,071

(22) PCT Filed: May 21, 2008

(86) PCT No.: PCT/EP2008/056260
§ 371 (c)(1),
(2), (4) Date: Mar. 25, 2010

(87) PCT Pub. No.: WO2008/142109
PCT Pub. Date: Nov. 27, 2008

(65) Prior Publication Data
US 2010/0210809 A1     Aug. 19, 2010

(30) Foreign Application Priority Data
May 21, 2007  (DE) .................. 10 2007 023 869

(51) Int. Cl.
*C08G 77/26*  (2006.01)

(52) U.S. Cl. ............... 528/26; 528/28; 528/27; 528/38
(58) Field of Classification Search .................. 528/26, 528/27, 28, 38
See application file for complete search history.

(56) References Cited

U.S. PATENT DOCUMENTS

| | | | |
|---|---|---|---|
| 4,833,225 | A | 5/1989 | Schaefer et al. |
| 5,606,077 | A | 2/1997 | Lersch et al. |
| 7,041,767 | B2 | 5/2006 | Lange et al. |
| 2004/0254325 | A1 | 12/2004 | Kuepfer et al. |
| 2006/0223939 | A1 | 10/2006 | Lange et al. |
| 2006/0237155 | A1 | 10/2006 | Wagner et al. |
| 2007/0092656 | A1 | 4/2007 | Keul et al. |
| 2009/0142293 | A1 | 6/2009 | Wagner et al. |

OTHER PUBLICATIONS

Novi et al., "Ammonium Functionalized Polydimethylsiloxanes: Synthesis and Properties", Macromolecular Chemistry and Physics, Feb. 2006. pp. 273-286.*
Novi et al., "Ammonium-Functionalized Polydimethylsiloxanes: Synthesis and Properties," Macromol. Chem. Phys. 2006, 207, pp. 273-286.
International Search Report for corresponding PCT/EP2008/056260 mailed Aug. 22, 2008, two pages.

* cited by examiner

*Primary Examiner* — Margaret Moore
(74) *Attorney, Agent, or Firm* — Rankin, Hill & Clark LLP

(57) ABSTRACT

The invention relates to novel polycarbonate- and/or polyurethane-polyorganosiloxane compounds, processes for their preparation, their use, precursors for their preparation and reactive compositions which contain the precursors.

21 Claims, No Drawings

POLYCARBONATE AND/OR POLYURETHANE POLYORGANOSILOXANE COMPOUNDS

BACKGROUND OF THE INVENTION

1. Field of the Invention

The invention relates to novel polycarbonate- and/or polyurethane-polyorganosiloxane compounds, processes for their preparation, their use, precursors for their preparation and reactive compositions which contain the precursors.

2. Description of Related Art

Siloxane block copolymers containing quaternary ammonium structures are widely known. These can be on the one hand di-block copolymers of the type of siloxane/quaternary ammonium unit (DE 33 40 708, EP 282720, U.S. Pat. No. 6,240,929, U.S. Pat. No. 6,730,766). On the other hand, tri-block copolymers which are based on the combination of siloxane/quaternary ammonium unit/polyether block have been developed (WO 02/10256, WO 02/10257, WO 02/10259, WO 2004/090007, WO 03/078504, WO 2004/041912, WO 2004/042136). An essential advantage of these tri-block copolymers is that the structure thereof can be adapted flexibly and within very wide limits to suit concrete product requirements.

It is furthermore known to react siloxanes terminated with amino groups with hydrocarbon-based diisocyanates to give di-block copolymer containing urea groups (US 2006/036055). Analogous urethane derivative have likewise been described (US 2004/087752).

GB 1128642 discloses quaternary ammonium compounds containing urea and urethane groupings. The reaction of amino- or hydroxy-terminated siloxanes with diisocyanates leads to isocyanate-terminated intermediate stages, which then react, for example, with primary-tertiary di- or triamines, after which the tertiary amino group is quaternized. It is possible e.g. to employ oligoethylene glycols as chain lengthening agents, but this leads to a consumption of isocyanate groups, which are then no longer available for the reaction with primary-tertiary diamines. The amount of quaternary ammonium groups which can be introduced consequently drops. A disadvantage of this solution is thus that flexible adaptation of the structure within wide limits to suit the concrete product requirements cannot take place.

It is furthermore known to react carbonate-functionalized siloxanes with hydrocarbons containing primary and secondary amino groups or hydroxyl groups to give silicones or corresponding esters containing urethane groups (U.S. Pat. No. 5,672,338, U.S. Pat. No. 5,686,547, DE 195 05 892).

It has likewise been proposed to use an unsymmetrically substituted carbonate as a linker group for the synthesis of siloxane-modified diquaternary compounds which contain urethane groups (WO 2005/058863).

Finally, the use of these unsymmetrically substituted carbonate "linkers" in the synthesis of polyurethane block copolymers containing siloxane units and with incorporated amine salt units has been described (C. Novi, A. Mourran, H. Keul, M. Möller, Macromol. Chem. Phys. 2006, 207, 273-286). A disadvantage of these compounds is that they only have pH-sensitive charges in the form of amine salts, which results in a reduced substantivity.

It is thus an object of the invention to discover siloxane block copolymers containing polyurethane block copolymers containing quaternary ammonium groups and siloxane units, which on the one hand allow a flexible adaptation of the structure within wide limits to suit the concrete product requirements, and in which on the other hand essential product properties can be influenced under the influence of donor-acceptor interactions by the urethane groups. It is a further object to discover suitable siloxane-containing precursors.

BRIEF SUMMARY OF THE INVENTION

The present invention provides novel polycarbonate- and/or polyurethane-polyorganosiloxane compounds which can react from stable precursors to give the desired polycarbonate- and/or polyurethane-polyorganosiloxane compounds in a targeted manner when used. The novel polycarbonate- and/or polyurethane-polyorganosiloxane compounds can be prepared easily, reliably and in a targeted manner and have novel interesting properties.

DETAILED DESCRIPTION OF THE PREFERRED EMBODIMENTS

The invention relates to novel polycarbonate- and/or polyurethane-polyorganosiloxane compounds containing at least one structural element of the formula (1):

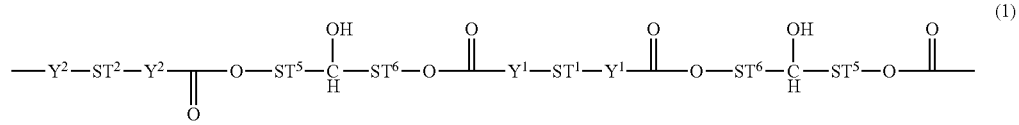

wherein $Y^1$ and $Y^2$ independently of each other are chosen from —O—, —S— and —NR$^2$—, wherein $R^2$=hydrogen or a straight-chain, cyclic or branched, saturated, unsaturated or aromatic hydrocarbon radical having up to 40 carbon atoms, which can contain one or more groups chosen from —O—, —C(O)—, —NH— and —NR$^3$, wherein R$^3$ is as defined above, and $ST^1$ and $ST^2$ independently of each other are chosen from divalent to more than divalent, preferably tetravalent, straight-chain, cyclic or branched, saturated, unsaturated or aromatic, substituted or unsubstituted hydrocarbon radicals having up to 1,000 carbon atoms, which can contain one or more groups chosen from —O—, —C(O)—, —NH—, —NR$^3$—,

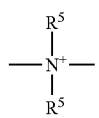

and a polyorganosiloxane unit having 2 to 1,000 silicon atoms, wherein $R^3$ is a straight-chain, cyclic or branched, saturated, unsaturated or aromatic hydrocarbon radical having up to 40 carbon atoms, which can contain one or more groups chosen from —O—, —C(O)— and —NH—, and $R^5$ is a straight-chain, cyclic or branched, saturated, unsaturated or aromatic hydrocarbon radical having up to 100 carbon atoms, which can contain one or more groups chosen from —O—, —C(O)— and —NH—, or $R^5$ is a divalent radical which forms cyclic structures within the radicals $ST^1$ and/or $ST^2$, or one or both of the radicals $Y^1$ adjacent to $ST^1$, with $ST^1$, and/or one or both of the radicals $Y^2$ adjacent to $ST^2$, with $ST^2$, can in each case form a nitrogen-containing heterocyclic radical, and wherein if a plurality of radicals $ST^1$ is present, these can be identical or different, and if a plurality of radicals $ST^2$ is present, these can be identical or different, $ST^5$ is an optionally substituted, divalent, straight-chain, cyclic or branched, saturated or unsaturated hydrocarbon radical having 1 to 12 carbon atoms, $ST^6$ is an optionally substituted, divalent, straight-chain, cyclic or branched, saturated or unsaturated hydrocarbon radical having 1 to 12 carbon atoms, with the proviso that at least one of the radicals $ST^1$ and/or $ST^2$ comprises a polyorganosiloxane radical, or acid addition compounds and/or salts thereof.

According to the invention, the term acid addition compounds means in particular salt-like compounds which are obtained by protonation of basic groups in the molecule, such as, in particular, amino groups optionally present, for example by reaction with inorganic or organic acids.

Salts of the compounds according to the invention result in particular from the formation of compounds containing quaternary ammonium groups, which contain, in particular, radicals

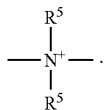

The case wherein one or both of the radicals $Y^1$ adjacent to $ST^1$, with $ST^1$, and/or one or both of the radicals $Y^2$ adjacent to $ST^2$, with $ST^2$, can in each case form a nitrogen-containing heterocyclic radical includes, for example, the case which results in particular from the use of cyclic diamines, such as piperazine, so that the structural element —Y-ST-Y— (where Y=$Y^1$ or $Y^2$ and ST=$ST^1$ or $ST^2$) has, for example, the following structure:

This variant also includes the case where the heterocyclic structure contains only one radical Y, so that —Y-ST-Y— has, for example, the following structure, i.e. piperidine derivatives:

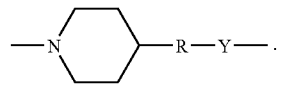

Substituents of the hydrocarbon radicals for $ST^1$ and $ST^2$ include one or more, preferably one to three substituents, which are preferably chosen from the groups which consists of: hydroxyl, halogen, such as fluorine or chlorine, and cyano.

The polyorganosiloxane structural element obligatorily present in the polycarbonate- and/or polyurethane-polyorganosiloxane compounds according to the invention preferably has the formula (2):

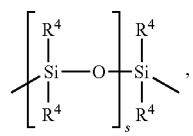

(2)

wherein $R^4$ is a straight-chain, cyclic or branched, saturated, unsaturated or aromatic hydrocarbon radical having up to 20 C atoms, and s=1 to 999.

Preferably:

$R^4$ is a $C_1$ to $C_{20}$, preferably $C_1$ to $C_9$, straight-chain or cyclic or branched, saturated or unsaturated or aromatic hydrocarbon radical, particularly preferably methyl and phenyl, and s is preferably 1 to 199, specifically 1 to 99.

In a particularly preferred case, the siloxane unit has the structure

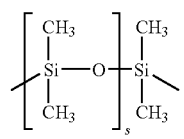

where s is as stated above.

In the polycarbonate- and/or polyurethane-polyorganosiloxane compounds according to the invention, $ST^5$ and $ST^6$ are each —$CH_2$—, so that the formula (I) has the following structure of the formula (3)

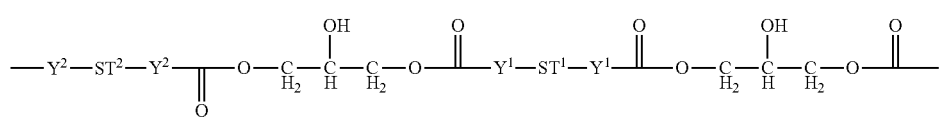

(3)

wherein $Y^1$, $Y^2$, $ST^1$ and $ST^2$ are as defined above.

In a preferred embodiment of the polycarbonate- and/or polyurethane-polyorganosiloxane compounds according to the invention, both $ST^1$ and $ST^2$ are each divalent radicals, so that linear polycarbonate- and/or polyurethane-polyorganosiloxane compounds are formed. Such linear polycarbonate- and/or polyurethane-polyorganosiloxane compounds of the invention are preferably used in those uses where a good miscibility or dispersibility in aqueous media is required. Such uses include, in particular, use as softeners for fibres, in particular in detergents, textile care compositions and textile finishing compositions, and modifying agents for thermoplastics.

However, branched polycarbonate- and/or polyurethane-polyorganosiloxane compounds, wherein at least one of the radicals $ST^1$ or $ST^2$ is trivalent or more than trivalent, preferably tetravalent, so that branched structures with linear recurring structures are formed from structural elements of the formula (1), are also included according to the invention.

Such polycarbonate- and/or polyurethane-polyorganosiloxane compounds of the invention containing branched structural elements are required in particular for those uses where thermosetting coatings or elastomers are prepared from the polycarbonate- and/or polyurethane-polyorganosiloxane compounds of the invention.

The polycarbonate- and/or polyurethane-polyorganosiloxane compounds according to the invention contain on average preferably at least two, more preferably at least three structural elements of the formula (1).

The polycarbonate- and/or polyurethane-polyorganosiloxane compounds according to the invention furthermore contain on average at least two, preferably at least three polyorganosiloxane structural elements of the formula (2).

The preferred polycarbonate- and/or polyurethane-polyorganosiloxane compounds according to the invention furthermore preferably contain at least one, more preferably at least two, still more preferably at least three recurring units of the formula (3):

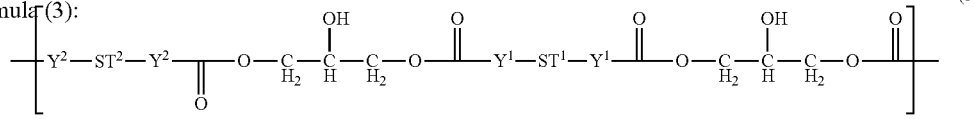

wherein $Y^1$, $Y^2$, $ST^1$ and $ST^2$ are as defined above. The number of recurring units of the formula (1) or (3) present in the polycarbonate- and/or polyurethane-polyorganosiloxane compounds according to the invention can be controlled within wide limits in a manner known per se via the choice of the stoichiometry of the starting compounds.

Depending on the meaning of the radicals $Y^1$ and $Y^2$, the polycarbonate- and/or polyurethane-polyorganosiloxane compounds according to the invention include polyurethane compounds, such as, for example (for $ST^5$ and $ST^6$=—CH$_2$—):

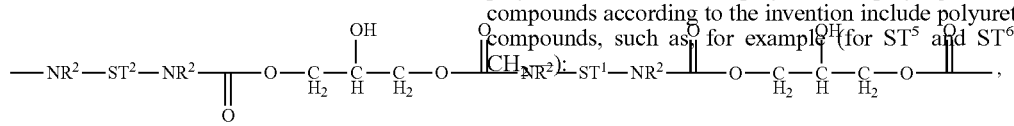

wherein $R^2$ is preferably H and the other variables are as defined above;

polycarbonate compounds, such as, for example (for $ST^5$ and $ST^6$=—CH$_2$—):

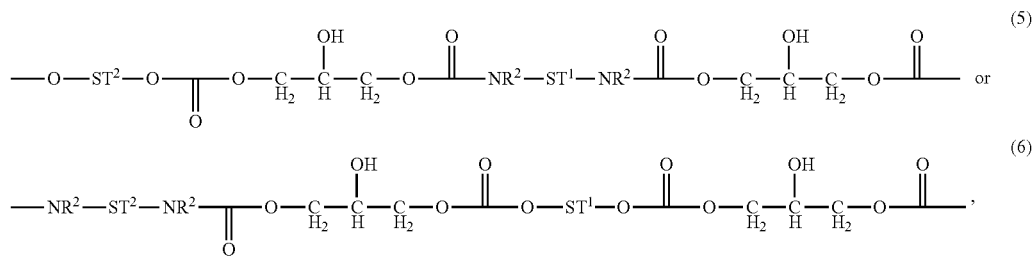

wherein $R^2$, $ST^1$ and $ST^2$ are as defined above.

Polycarbonate- and/or polyurethane-polyorganosiloxane compounds wherein $Y^1$ is —NR$^2$—, wherein $R^2$ is as defined above, preferably hydrogen, are preferred according to the invention.

Polyurethane-polyorganosiloxane compounds according to the invention wherein $Y^1$ and $Y^2$ are —NR$^2$—, wherein $R^2$ is as defined above, preferably hydrogen, are furthermore preferred.

Polyurethane-polyorganosiloxane compounds wherein $Y^1$ and $Y^2$ are —NH— are particularly preferred according to the invention.

In a further preferred embodiment of the polycarbonate- and/or polyurethane-polyorganosiloxane compounds according to the invention, these contain amino groups, protonated amino groups and/or quaternary ammonium groups. The presence of quaternary ammonium groups, which serves in particular to establish hydrophilic properties, such as are advantageous in particular in use in aqueous compositions, is particularly preferred. In the compounds according to the invention, the amino groups can also be, in particular, terminal groups.

Linear polycarbonate- and/or polyurethane-polyorganosiloxane compounds wherein the radicals $ST^1$ and $ST^2$ are identical and are in each case divalent are preferred according to the invention.

In a preferred embodiment of the present invention, the radicals $ST^1$ and $ST^2$ can in each case be divalent and identical, and the radicals $Y^1$ and $Y^2$ can also be identical. The compound of the formula (7):

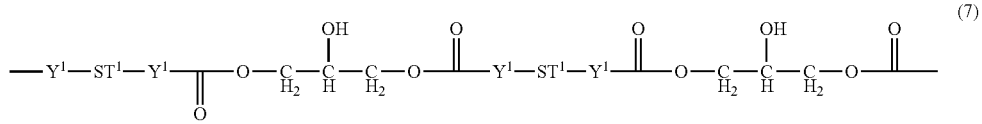

for example, then results, so that the compound is simplified to recurring units of the formula (8)

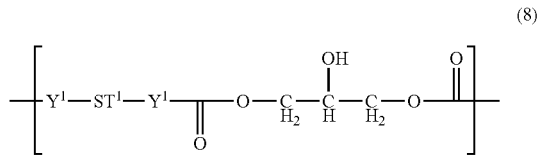

wherein, according to the invention, at least one radical $ST^1$ must then contain a polyorganosiloxane group.

In an embodiment of the invention which is likewise preferred, the radicals $ST^1$ and $ST^2$ in the polycarbonate- and/or polyurethane-polyorganosiloxane compounds, however, are different ($ST^1 \neq ST^2$). This allows a greater flexibility in controlling the properties via the choice of the radicals $ST^1$ and $ST^2$.

In a further preferred embodiment of the invention, the polycarbonate- and/or polyurethane-polyorganosiloxane compounds contains at least one radical $ST^1$ of the following formula (9):

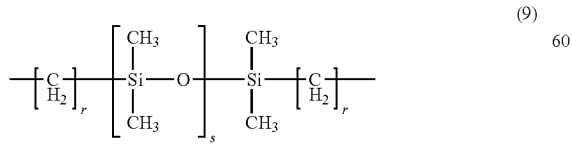

wherein s is as defined above, r is from 1 to 12, preferably 1 or 3.

In a further preferred embodiment of the invention, the polycarbonate- and/or polyurethane-polyorganosiloxane compounds contain at least one radical $ST^2$ with quaternary groups, of the formula (10):

$$-ST^3-N^+(R^5)_2-ST^4-N^+(R^5)_2-ST^3- \quad (10)$$

wherein $R^5$ is as defined above, $ST^3$ is a straight-chain or cyclic or branched, saturated or unsaturated or aromatic, substituted or unsubstituted hydrocarbon radical having to 2 to 100 carbon atoms, which can be substituted by —O—, —C(O)—, —NH—, —NR$^3$—, wherein $R^3$ is as defined above, and $ST^4$ is a straight-chain or cyclic or branched, saturated or unsaturated or aromatic, substituted or unsubstituted hydrocarbon radical having to 2 to 100 carbon atoms, which can be substituted by —O—, —C(O)—, —NH—, —NR$^3$— and by a polyorganosiloxane unit having 2 to 200 silicon atoms, wherein $R^3$ is as defined above.

Substituents of the hydrocarbon radicals for $ST^3$ and $ST^4$ include one or more, preferably one to three substituents which are preferably chosen from the group which consists of: hydroxyl, halogen, such as fluorine or chlorine, and cyano. In this context, hydroxyl is particularly preferred, in particular for $ST^4$.

The polycarbonate- and/or polyurethane-polyorganosiloxane compound of the following recurring units accordingly represents a preferred embodiment of the invention:

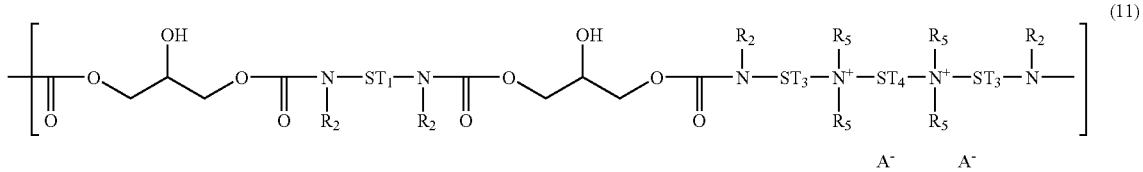

wherein $ST^1$, $ST^3$, $ST^4$, $R^2$ and $R^5$ are as defined above, and

A$^-$ is an organic or inorganic anion, with the proviso that at least one of the radicals $ST^1$, $ST^3$ and $ST^4$ contains a polyorganosiloxane unit. The hydrocarbon radicals $ST^1$ are in particular structures which are derived directly from primary and secondary amines or alcohols which are difunctional or of higher functionality.

Particularly preferred difunctional structures $ST^1$ are:

divalent, straight-chain hydrocarbon radicals having up to 15 carbon atoms, for example hexamethylene, divalent, cyclic hydrocarbon radicals having up to 15 carbon atoms, for example based on bis-cyclohexylmethane structures

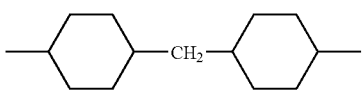

or piperazine or commercially available bis-secondary amines, such as Jefflink® 754 (Huntsman Corp.)

divalent, branched hydrocarbon radicals having up to 15 carbon atoms, for example based on methylcyclohexyl or isophorone structures

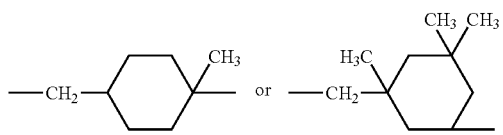

divalent, aromatic hydrocarbon radicals having up to 15 carbon atoms, for example based on 2,4-toluyl, 2,6-toluyl, bis-phenylmethane and naphthylene structures

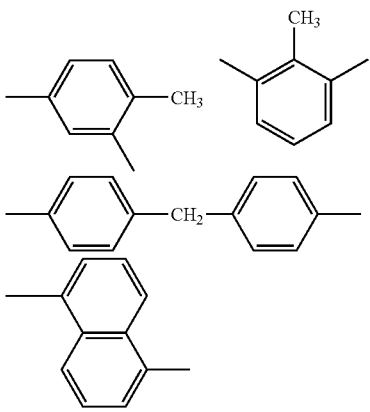

It is furthermore within the context of the invention also to employ primary and secondary amines or alcohols of higher functionality for formation of the hydrocarbon radical $ST^1$. An example is $N(CH_2CH_2NH_2)_3$.

Further examples of polyamines or polyols which can contribute to the radical $ST^1$ include, for example: hexamethylenediamine, phenylenediamine, toluenediamine, cyclohexanediamine, ethylenediamine and oligomers thereof, trimethylolpropane, glycol, glycerol, pentaerythritol, sugars, or polyalkoxylated derivatives of polyamines or polyols.

In another preferred embodiment, the hydrocarbon radicals $ST^1$ are more complex structures which are derived from primary and secondary amino-functionalized or hydroxy-functionalized prepolymers, which can likewise be of higher functionality.

Examples are:
  primary or secondary amino-terminated or hydroxy-terminated polyethers, preferably ethylene oxide- and propylene oxide-based polyethers, for example primary and secondary amino-terminated polyethers of the Jeffamine® type, for example of the ED and T series (Huntsman Corp.),
  $NH_2$— or OH-terminated polyamides,
  $NH_2$— or OH-terminated polyureas.

The introduction according to the invention of siloxane blocks into $ST^1$ is preferably carried out via α,ω-primary or secondary amino-functionalized polyorganosiloxanes.

The preparation of the corresponding α,ω-primary or secondary aminoalkyl-terminated polyorganosiloxanes is prior art (Silicone, Chemie and Technologic, Vulkan Verlag Essen 1989, p. 85-90).

It is furthermore within the context of the invention to employ polyorganosiloxanes of higher functionality carrying primary or secondary amino groups for formation of the hydrocarbon radical $ST^1$. These comb-like and optionally α,ω-amino-functionalized siloxanes are likewise known from the prior art.

The polycarbonate- and/or polyurethane-polyorganosiloxane compounds according to the invention are preferably prepared by a process which includes the reaction of a compound of the formula (12)

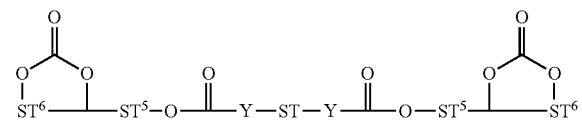

(12)

wherein $ST=ST^1$ or $ST^2$, which are as defined above, and $Y=Y^1$ or $Y^2$, which are as defined above, and $ST^5$ and $ST^6$ are as defined above, with a compound of the formula

HY-ST-YH wherein $ST=ST^1$ or $ST^2$ and Y is as defined above, with the proviso that at least one of the radicals $ST^1$ and/or $ST^2$ comprises a polyorganosiloxane radical.

In a preferred variant of the process, $Y=NR^2$, wherein $R^2$ is as defined above, preferably hydrogen, and $ST^5$ and $ST^6$ are each —$CH_2$—.

The polycarbonate- and/or polyurethane-polyorganosiloxane compounds according to the invention can furthermore be prepared by a process which includes the reaction of a compound of the formula

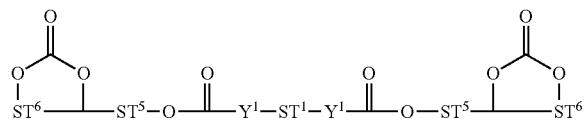

(13)

wherein $ST^5$, $ST^6$, $Y^1$ and $ST^1$ are as defined above, with a compound of the formula $HY^2$-$ST^3$-$NR^5_2$, wherein $ST^3$, $Y^2$ and $R^5$ are as defined above,
(Preferably, in the process variant described above, $ST^5$ and $ST^6$ are each —$CH_2$—, $Y^1$ and $Y^2$ are independently of each other —$NR^2$—, wherein $R^2$ is as defined above, preferably hydrogen),
and a compound of the formula

Q-$ST^{4V}$—Q, (In this further embodiment, the polycarbonate- and/or polyurethane-polyorganosiloxane compounds contain at least one radical $ST^2$ with quaternary groups, of the formula (10):

$$-ST^3-N^+(R^5)_2-ST^4-N^+(R^5)_2-ST^3- \quad (10)$$

wherein $ST^3$, $ST^4$ and $R^5$ are as defined above), wherein Q is a radical which is capable of alkylation of an amino group, and $ST^{4V}$, together with the molecular part originating from Q after the quaternization reaction, forms the radical $ST^4$, with the proviso that at least one of the radicals $ST^1$, $ST^3$ and/or $ST^4$ comprises a polyorganosiloxane radical which is divalent or more than divalent. and $ST^{4'}=ST^{4V}$ or a radical $ST^{4V}$ which is optionally modified after the reaction, such as, for example, a haloalkyl radical after the reaction.

The radicals Q which are capable of quaternization or, respectively, alkylation of the amino groups are preferably chosen from epoxy groups and haloalkyl groups. The following example is given to illustrate the radical $ST^{4V}$:

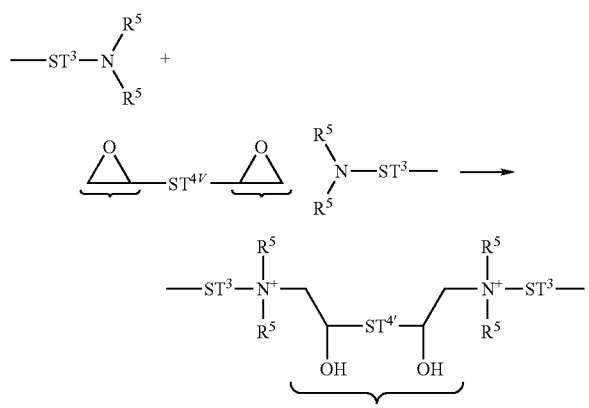

$ST^4$ is thus formed $ST^4$; $T^{4V}$ after reaction of the alkylating group Q, e.g. the molecule parts resulting from the haloalkyl or epoxy groups.

The polycarbonate- and/or polyurethane-polyorganosiloxane compounds which are preferably prepared by this process are thus those which contain at least one radical $ST^2$ of the formula (10):

(10)

wherein $ST^3$, $ST^4$ and $R^5$ are as defined above.

For the preparation of the compounds of the formula (12)

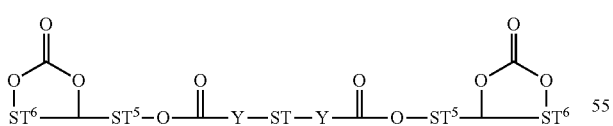

(12)

wherein Y, ST, $ST^5$ and $ST^6$ are as defined above, in one embodiment of the invention, in a first step the amino- or hydroxy-terminated ST starting substance dealt with above HY-ST-YH, wherein Y and ST are as defined above, are reacted with carbonic acid phenyl esters of the structure

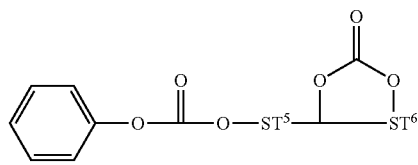

such as, for example,

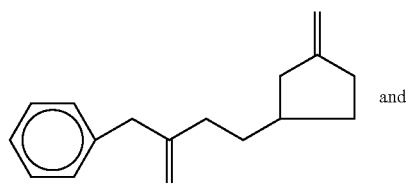

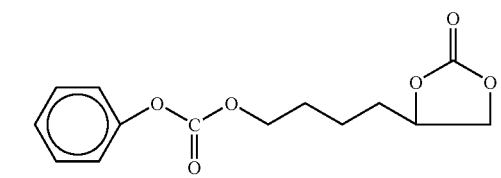

(see e.g. WO 2005/058863).

According to another embodiment of the invention, it is possible to convert, with an excess of $COCl_2$, the amino- or hydroxy-terminated starting substance contributing the ST radical into the corresponding chloroformic acid derivatives, which then react with

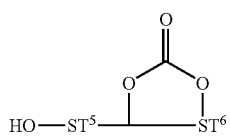

preferably

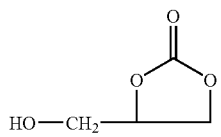

to give the carbonate-terminated intermediate products.

According to a further embodiment of the invention, it is possible first to convert the carbonate precursor

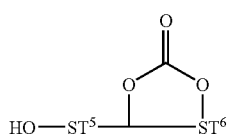

preferably

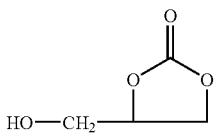

with an excess of $COCl_2$ into chloroformic acid ester derivatives, which finally react with the amino- or hydroxy-terminated starting substances contributing the radical ST, in particular $ST^1$, to give the carbonate-terminated intermediate stages.

The advantage of this reaction concept is the avoidance of phenol as a leaving group.

As a result of these reactions, cyclic carbonate-terminated intermediates containing ST, in particular $ST^1$, are thus formed.

These intermediates can be reacted with suitable partners containing ST, in particular $ST^2$. These reaction partners are substances which have two reactive amino or hydroxyl units. Reactive amino groups are very preferred in this context, since they have a relatively high reactivity towards the cyclic carbonates, whereas the hydroxyl groups have only a low reactivity.

In a preferred embodiment, the structures here are primary-tertiary or secondary-tertiary diamino structures, such as, for example, N,N-dimethylpropylenediamine. A prerequisite of the use of such diamino structures is the simultaneous use of polyfunctional, in particular difunctional quaternizing agents, since otherwise no chain formation is possible. The formation of the $ST^2$ structural element of the formula (10):

$$-ST^3-N^+(R^5)_2-ST^4-N^+(R^5)_2-ST^3- \quad (10)$$

takes place in this manner.

The use of e.g. N-methylpiperazine includes the possibility that cyclic ST, in particular $ST^2$ structures can form.

The use of primary-secondary diamines is also possible.

After the build up of the chain, amino groups which remain can optionally be alkylated.

Examples of amino structures of higher functionality for producing branched compounds are:
  N,N,N',N'-tetramethyldipropylenetriamine (Jeffcat ZR50B Huntsman)
  N,N,N',N'-tetramethyldiethylenetriamine
  The reactions of

with the amino-functional or hydroxy-functional $ST^2$ precursors are preferably carried out in the range of from room temperature to 160° C., preferably to 140° C. The reaction times are a few minutes to some hours. In this context, the amino-functional precursors which form the $ST^2$ unit are in general more reactive than the hydroxy-functional $ST^2$ precursors.

The reaction times, the reaction temperatures and the conversion achieved depend in particular on the type of amino groups on the precursors forming the $ST^2$ unit. Generally, primary amino groups react more readily than secondary amino groups.

The quaternization compound is needed in the preparation of the polycarbonate- and/or polyurethane-polyorganosiloxane compounds containing $ST^3$ and $ST^4$ in order to render possible a polymerization with chain formation. In a preferred embodiment, the partners containing $ST^4$ are hydrocarbon-based α,ω-epoxy- and/or halogen-functionalized substances.

The hydrocarbon-based epoxide derivatives are preferably
  hydrocarbon diepoxides, for example vinylcyclohexene diepoxide,
  epichlorohydrin,
  epoxy-terminated polyethers, preferably ethylene oxide- and propylene oxide-based polyethers, for example glycidyl-terminated polyethers,
  epoxy-terminated polyesters,
  epoxy-teiniinated polycarbonates.

The halogen-functionalized hydrocarbon derivatives, preferably chlorides and bromides, are preferably
  hydrocarbon dihalides
  halogen-terminated polyethers, preferably ethylene oxide- and propylene oxide-based polyethers
  halocarboxylic acid esters of hydrocarbon diols and polyethers, preferably ethylene oxide- and propylene oxide-based polyethers, specifically chloroacetic acid esters, chloropropionic acid esters and chlorobutanoic acid esters of hydrocarbon diols and polyethers.

It is likewise within the context of the invention to convert difunctional acid alkoxylates into corresponding glycidyl, halogen or halocarboxylic acid ester derivatives and to employ them according to the invention. These are derived, for example, from succinic acid.

The synthesis of the particularly preferred chlorocarbonic acid esters is carried out in a known manner (Organikum, Organisch-Chemisches Grundpraktikum, 17th edition, VEB Deutscher Verlag der Wissenschaften, Berlin 1988, p. 402-408) by reaction of the diol component with the corresponding halocarboxylic acid anhydrides or halocarboxylic acid chlorides.

In a further embodiment, the hydrocarbon radicals $ST^4$ are more complex α,ω-epoxy- or halogen-terminated structures which are derived from α,ω-hydroxy-functionalized prepolymers. These α,ω-hydroxy-functionalized prepolymers are preferably the reaction products of
  diols with diisocyanates
  OH-tetininated polyethers, preferably ethylene oxide- and ropylene oxide-based polyethers with diisocyanates
  OH-terminated polyesters,
  OH-terminated polycarbonates In a preferred embodiment, these α,ω-hydroxy-functionalized prepolymers are converted into the corresponding α,ω-halocarboxylic acid esters, specifically chloroacetic acid esters, chloropropionic acid esters and chlorobutanoic acid esters.

The introduction according to the invention of siloxane blocks into $ST^4$ is preferably carried out via
  α,ω-epoxy-terminated siloxanes, preferably α,ω-glycidyl- and epoxycyclohexyl-terminated siloxanes
  α,ω-haloalkyl-telininated siloxanes, preferably chloropropyl- and chloropropenyl-terminated siloxanes
  α,ω-halocarboxylic acid ester-terminated siloxanes, preferably esters of chloroacetic acid, chloropropionic acid and chlorobutanoic acid
  α,ω-halocarboxylic acid ester-terminated polyether-siloxanes, preferably esters of chloroacetic acid, chloropropionic acid and chlorobutanoic acid.

The preparation of the α,ω-epoxy-terminated siloxanes and α,ω-haloalkyl-terminated siloxanes entering into $ST^4$ is described in the prior art (Silicone, Chemie and Technologie, Vulkan Verlag Essen 1989, p. 85-90 and 120).

The preparation of α,ω-halocarboxylic acid ester-terminated siloxanes can be carried out analogously to the procedure according to WO 02/10256, Example 1. In this, SiH-siloxanes are reacted with halocarboxylic acid esters of olefinically or acetylenically unsaturated alcohols.

The preparation of α,ω-halocarboxylic acid ester-terminated polyether-siloxanes can be carried out analogously to WO 02/10257, Example 1. In this, SiH-siloxanes are reacted with halocarboxylic acid esters of olefinically or acetylenically unsaturated polyethers. Alternatively, it is possible to react polyether-siloxanes with halocarboxylic acids or anhydrides or acid chlorides thereof (U.S. Pat. No. 5,153,294, U.S. Pat. No. 5,166,297).

In a particularly preferred case, the siloxane unit in the ST units has the structure

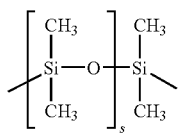

where s is as stated above.

In a further embodiment, the introduction of siloxane blocks into the ST structures is carried out via α,ω-epoxy- or halogen-functionalized siloxane prepolymers, which can preferably be obtained from the corresponding α,ω-hydroxyalkyl or α,ω-hydroxypolyether-terminated siloxane prepolymers.

These OH-terminated siloxane-containing prepolymers are preferably prepared by reaction of
α,ω-hydroxyalkyl-terminated siloxanes with diisocyanates,
α,ω-polyether-terminated siloxanes with diisocyanates
and are then converted into the epoxy and halogen derivatives. The α,ω-halocarboxylic acid-functionalized siloxane prepolymers which are accessible by esterification with e.g. the anhydrides and acid chlorides represent a preferred embodiment.

It is furthermore within the context of the invention to employ hydrocarbon-based or siloxane-based substances of higher functionality for formation of the radical ST2. These materials contain more than two of the epoxy or halogen functions dealt with above.

Examples of hydrocarbon-based substances of higher functionality are the glycidyl or chloroacetic acid ester derivatives of glycerol, pentaerythritol, sorbitol, and ethoxylates and/or propoxylates thereof. It is likewise within the context of the invention to convert acid alkoxylates of higher functionality into corresponding glycidyl or chloroacetic acid ester derivatives and to employ them according to the invention. These are derived, for example, from trimellitic acid or pyromellitic acid.

Suitable siloxane-based substances of higher functionality with α,ω- and/or comb-like epoxy or halogen, preferably halocarboxylic acid ester, substitution can be obtained, for example, from hydroxy-functional precursors, which are accessible by addition of allyl alcohol, butynediol and the alkoxylates of allyl alcohol or butynediol on to corresponding SiH-siloxanes. Alternatively, for example, unsaturated epoxy- or halocarboxylic acid ester-functional precursors can be added on to corresponding SiH-siloxanes.

It is an essential feature that the functionality of these hydrocarbon-based or siloxane-based substances of higher functionality is greater than two.

It is furthermore within the context of the invention to employ monofunctional hydrocarbon-based or siloxane-based substances for formation of terminal radicals ST. These materials preferably contain one of the epoxy or halogen functions dealt with above.

Examples of monofunctional hydrocarbon-based substances are the glycidyl or chloroacetic acid ester derivatives of alkanols, for example ethanol, 2-propanol, dodecanol and octadecanol, alkenols, for example allyl alcohol, hexenol and oleyl alcohol, and alkynols, for example propynol, and the alkoxylates, specifically ethoxylates and/or propoxylates, of the monofunctional alcohols mentioned. It is likewise within the context of the invention to convert fatty acid alkoxylates into corresponding glycidyl or chloroacetic acid ester derivatives and to employ them according to the invention.

Suitable monofunctional siloxane-based substances with epoxy or halogen, preferably halocarboxylic acid ester, substitution are known e.g. from WO 02/10256. They can be obtained, for example, from unsaturated epoxy- or halocarboxylic acid ester-functional precursors which can be added on to corresponding SiH-siloxanes.

Depending on their nature, these monofunctional hydrocarbon-based or siloxane-based $ST^2$ precursors are added in order to regulate the molecular weight of the polymers formed and, where appropriate in cooperation with the $ST^2$ precursors of higher functionality, to control the degree of branching of the polymer chains.

If epoxy-containing substances are used for introduction of $ST^2$, acid is added in stoichiometric amounts in a manner known from the prior art. The acid anions are inorganic anions, such as halide, specifically chloride, and organic anions, such as carboxylate, specifically $C_2$ to $C_{18}$-carboxylate, alkyl polyether-carboxylate, alkyl sulfate, specifically methosulfate, sulfonate, specifically alkylsulfonate and alkylarylsulfonate, very specifically toluylsulfonate.

It is within the context of the invention to carry out the entire reaction sequence or individual part steps without a solvent or in the presence of solvents. Preferred solvents are typical lacquer solvents, such as methoxypropyl acetate, butyl acetate and toluene.

As a result of the total reaction sequence described, using the quaternizing reagents quaternized polycarbonate- and/or polyurethane-polyorganosiloxane compounds which have polyorganosiloxane units at least in one of the structural elements ST, including $ST^1$ to $ST^4$, are obtained.

The invention furthermore relates to the use of the polycarbonate- and/or polyurethane-polyorganosiloxane compounds according to the invention for the preparation of coatings, agents for modification of surfaces, elastomers, thermosets, adhesives, primers for metal and plastics surfaces, polymer additives, detergent additives, rheological agents, cosmetics and agents for modification of fibres.

In cosmetic formulations for hair, in this context the polycarbonate- and/or polyurethane-polyorganosiloxane compounds according to the invention can exert in particular the function of so-called conditioning agents ("conditioner"), i.e. in particular favourably influence the properties of hair, such as softness, shine, fullness, combability etc., it also being possible for them to be used, in particular, in combination with other conventional conditioning agents, such as e.g. poly-alpha-olefins, fluorinated oils, fluorinated waxes, fluorinated rubbers, carboxylic acid esters having at least 10 carbon atoms, cationic polymers, silicones which are insoluble or soluble in the medium of the formulation, mineral oils, plant oils and animal oils and mixtures thereof, as described, for example, in WO 99/009939.

The invention furthermore preferably relates to the use of the polycarbonate- and/or polyurethane-polyorganosiloxane compound according to the invention for the preparation of coatings or agents for modification of surfaces on hard surfaces, such as, for example, glass, ceramic, tiles, concrete and steel parts, such as automobile bodies and ship hulls.

The invention furthermore preferably relates to the use of the polycarbonate- and/or polyurethane-polyorganosiloxane compounds according to the invention for the preparation of primers for bonding silicone elastomers with other substrates, such as steel, aluminium, glass and plastics, such as epoxy resins, polyamides, polyphenylene sulfides and polyesters, such as polyterephthalates.

In a further preferred embodiment of the invention, this relates to the use of the polycarbonate- and/or polyurethane-polyorganosiloxane compounds according to the invention for the preparation of modifying agents for thermoplastics, such as polyolefines, polyamides, polyurethanes, poly(meth)acrylates and polycarbonates.

In a further preferred embodiment of the invention, this relates to the use of the polycarbonate- and/or polyurethane-polyorganosiloxane compounds according to the invention for the preparation of low temperature impact modifiers.

In this context, the expression "for the preparation of" as used above also includes the case where the polycarbonate- and/or polyurethane-polyorganosiloxane compounds according to the invention are used by themselves for the use mentioned. That is to say, for example, the polycarbonate- and/or polyurethane-polyorganosiloxane compounds according to the invention can be used themselves directly as low temperature impact modifiers. However, they can also be provided suitably beforehand, for example by mixing, compounding or preparation of masterbatches.

The polycarbonate- and/or polyurethane-polyorganosiloxane compounds can furthermore preferably be used as a constituent in adhesives and sealants, as a base material for thermoplastic elastomers, such as, for example, cable sheathings, hoses, seals and keyboard mats, and for membranes, such as selectively gas-permeable membranes. A further use of the copolymers according to the invention comprises coatings, such as antifouling and non-stick coatings, fabric-compatible coatings, flame-retardant coatings and biocompatible materials.

These can serve as coating compositions for cosmetics, body care compositions, lacquer additives, an auxiliary substance in detergents, defoamer formulations and textile processing, for modification of resins or for modification of bitumen.

Further uses include packaging material for electronic components, insulation or shielding materials, sealing material in hollow spaces where condensation water forms, such as aircraft, airframes, ships and automobiles, antifogging coatings for floodlight screens (inside), panes for residential buildings, vehicles or medical equipment and additives for polishing, cleaning or care compositions, as an additive for body care compositions, as a coating material for wood, paper and cardboard, as a mould release agent, as a biocompatible material in medical uses, such as contact lenses, as a coating material for textile fibres or textile fabric, as a coating material for natural substances, such as e.g. leather and furs, as a material for membranes and as a material for photoactive systems, e.g. for lithographic processes, optical data protection or optical data transmission.

In a further preferred embodiment of the invention, this relates to the use of the polycarbonate- and/or polyurethane-polyorganosiloxane compounds according to the invention for the preparation of viscosity regulators, antistatic agents, of mixing components for silicone rubbers which can be crosslinked to elastomers peroxidically or by hydrosilylation (platinum catalysis), and there lead to modification of surface properties, to modification of the diffusion of gases, liquids etc., or modify the swelling properties of the silicone elastomers, of softeners for textile fibres for treatment of the textile fibres before, during and after washing, of agents for modification of natural and synthetic fibres, such as, for example, hair, cotton fibres and synthetic fibres, such as polyester fibres and polyamide fibres and blended fabrics, of textile finishing agents, and of detergent-containing formulations, such as detergents and cleaning compositions.

The present invention furthermore relates to novel detergent formulations, cosmetic formulations and fibre treatment formulations which contain the polycarbonate- and/or polyurethane-polyorganosiloxane compounds according to the invention.

The polycarbonate- and/or polyurethane-polyorganosiloxane compounds according to the invention can thus be present, for example, in solid or liquid detergent formulations in contents of from about 0.1 to 10% by wt., based on the total amount of the formulation, and present in cosmetic formulations and formulations for fibre treatment, such as textile care compositions before, during and after washing, in contents of from about 0.1 to 50% by wt., based on the total amount of the formulation.

Preferably, the polycarbonate- and/or polyurethane-polyorganosiloxane compounds according to the invention can be employed for treatment and finishing of hard surfaces, such as glass, ceramic, tiles, plastics surfaces, metal surfaces and lacquer surfaces, specifically ship hulls and automobile bodies, quite specifically also in dryer formulations for mechanical washing of automobiles, as adhesives or primers, preferably for bonding silicone elastomers with other substrates, such as steel, aluminium, glass, epoxy resin or polyamide, as modifiers, e.g. low temperature impact modifiers and polarity modifiers, for hydrocarbon-based polymers and silicone-based elastomer systems based on peroxidic and Pt-catalysed crosslinking.

They can furthermore be used for treatment of natural and synthetic fibres, for example cotton, wool and polyester- and polyamide-based synthetic fibres, specifically in the form of textiles, in special compositions for fibre treatment, in particular in detergent formulations containing anionic, nonionic and cationic surfactants, wherein the compounds according to the invention can be incorporated into the detergent directly or metered in separately as the washing process runs or after the washing process, and softness, improved elasticity and reduced tendency to crease are imparted to the substrates treated, while retaining an acceptable hydrophilicity.

They can likewise serve as a constituent of separate softener systems, specifically based on cationic surfactants, after washing of fibres and textiles, as an ironing aid and an agent for preventing or reversing creases in textiles.

They can furthermore be used for finishing fibres, specifically for the first finishing and treatment of, for example, cotton, wool and polyester- and polyamide-based synthetic fibres, specifically in the form of textiles, paper and wood.

As described above, they can furthermore advantageously be employed in cosmetic systems for treatment of hair and skin.

Particularly preferred fields of use for the polycarbonate- and/or polyurethane-polyorganosiloxane compounds according to the invention are also, preferably aqueous, solutions, mixtures, emulsions and microemulsions, in particular as a base for cosmetic formulations.

The polycarbonate- and/or polyurethane-polyorganosiloxane compounds according to the invention can be used as a pure substance, solution, mixture, emulsion or microemulsion in the form of liquids, creams or pastes, as a starting substance for the preparation of suitable cosmetic formulations according to the invention of various viscosities.

The process for the preparation of formulations of the polycarbonate- and/or polyurethane-polyorganosiloxane compounds according to the invention, such as, for example, for treatment of substrates, such as hard or flexible substrates, can comprise, for example, the following steps:

a) preparation of a premix in the form of solutions, mixtures or emulsions with the polycarbonate- and/or polyurethane-polyorganosiloxane compounds according to the invention and b) preparation of a further mixture using the premix a) and addition optionally of further surfactants, auxiliary substances and other additives, or c) combination of steps a) and b), in which the mixing of the constituents is carried out with stirrers, dissolvers, kneaders, pumps, mixing screws, mixing nozzles and low and high pressure emulsifying apparatuses.

The processes are realized with the machines and apparatuses known in the art (Ullmann's Enzyklopädie), such as e.g. any form of stirrers in suitable containers, apparatuses or mixing apparatuses, as described above.

Direct mixing of all the constituents is possible. However, the preparation of a premix is preferred, since it leads to faster and better distribution and is partly unavoidable, since the various substance groups otherwise cannot be mixed or emulsified or dispersed with one another in a suitable manner, or can be only with a high outlay. Suitable premixes or intermediate mixtures can preferably be mixtures in the form of solutions, pastes, creams or other forms of emulsions or dispersions. The preparation and use of microemulsions of 10 to 200 nm average particle diameter in cosmetic formulations is particularly preferred.

The formulations which contain the polycarbonate- and/or polyurethane-polyorganosiloxane compounds according to the invention can be prepared, for example, in various presentation forms, such as for hair treatment. Preferably, the compositions containing the polycarbonate- and/or polyurethane-polyorganosiloxane compounds according to the invention are used as cosmetic formulations for treatment of keratin-containing substrates, such as e.g. human and animal hair or skin, as an alcoholic or polyalcoholic solution or as an emulsion. Depending on the raw materials and auxiliary substances used and the mixing process during the preparation, clear, cloudy and white formulations are obtained.

Alcoholic and polyalcoholic solvents and mixtures thereof with water, oil-like substances and conventional silicones (inter alia polydimethylsiloxanes) and binary and ternary mixtures of solvents and/or oil-like substances and/or silicones are preferably suitable for the preparation of solutions and mixtures which contain the polycarbonate- and/or polyurethane-polyorganosiloxane compounds according to the invention. Particularly preferred solvents here are ethanol, isopropanol, ethylene glycol and ethylene glycol ethers, polyethylene glycols and ethers thereof, propylene glycol and propylene glycol ethers, polypropylene glycols and ethers thereof and glycerol and mixtures thereof. Particularly preferred oil-like substances are mineral oil products and oils of plant, animal and synthetic origin and mixtures thereof. Particularly preferred silicones, which differ from the polycarbonate- and/or polyurethane-polyorganosiloxane compounds according to the invention, include cyclic and linear polydimethylsiloxanes and mixtures thereof, such as e.g. (according to INCI) cyclomethicone, cyclotetrasiloxane, cyclopentasiloxane, cyclohexasiloxane, dimethicone with a viscosity range of from 0.65 to 60,000,000 mPa·s at 25° C. and dimethiconol with a viscosity range of from 10 to 60,000,000 mPas. at 25° C.

Preferred solutions and mixtures which contain the polycarbonate- and/or polyurethane-polyorganosiloxane compounds according to the invention have the following composition in % by wt., based on the total weight of the composition:

Solutions or mixtures:

| | |
|---|---|
| 0.1-99.9% | polycarbonate- and/or polyurethane-polyorganosiloxane compounds according to the invention |
| 0.1-99.9% | solvent and/or oil and/or silicones and/or water |

Compositions of emulsions of the polycarbonate- and/or polyurethane-polyorganosiloxane compounds according to the invention:

For preparation of the emulsions, water and nonionic, cationic and amphoteric surfactants and surfactant mixture are generally used. Emulsions can moreover contain auxiliary substances, such as e.g. inorganic and organic acids, bases and buffers, salts, thickeners, stabilizers for emulsions, such as e.g. "xanthan gum", preservatives, foam stabilizers, defoamers and solvents, such as e.g. alcohols (ethanol, isopropanol, ethylene glycol, polyethylene glycol, propylene glycol, polypropylene glycol, glycol ethers and glycerol and mixtures thereof).

The polycarbonate- and/or polyurethane-polyorganosiloxane compounds according to the invention which are used in the emulsions can also themselves serve as an emulsifier in the preparation of emulsions.

A preferred emulsion which can preferably be used for the preparation of cosmetic formulations comprises, for example, the following constituents in % by wt., based on the total amount of the composition:

| | |
|---|---|
| 10-50% | polycarbonate- and/or polyurethane-polyorganosiloxane compounds according to the invention, |
| 1-35% | surfactants, |
| 0-10% | auxiliary substances, |
| 0-20% | solvent, |
| to 100% | topped up by water. |

Microemulsions for cosmetic formulations, finishing of textiles and other fibrous substrates or coating of hard surfaces:

The preparation of microemulsions with a high active content of polycarbonate- and/or polyurethane-polyorganosiloxane compounds according to the invention is particularly preferred, since in addition to the possibility of the preparation of clear cosmetic formulations, these additionally offer the advantage of incorporation into aqueous formulations by simple process technology ("cold process"). There is the possibility of employing the polycarbonate- and/or polyurethane-polyorganosiloxane compounds according to the invention in the preparation of microemulsions in the form of the solutions and mixtures described above. A preferred active content of the polycarbonate- and/or polyurethane-polyorganosiloxane compounds according to the invention in the emulsion is between 5 and 60% by wt., and 10-50% by wt. is particularly preferred, based on the total amount of the composition.

A quite specifically preferred microemulsion comprises the following constituents, which do not, however, limit the invention, in % by wt., based on the total amount of the microemulsion:

| | |
|---|---|
| 20-80% | polycarbonate- and/or polyurethane-polyorganosiloxane compounds according to the invention |
| 0-35% | surfactants |
| 0-10% | auxiliary substances |
| 0-20% | solvent |
| to 100% | topped up by water. |

The invention also provides the use of the solutions, mixtures or emulsions prepared with the polycarbonate- and/or polyurethane-polyorganosiloxane compounds according to the invention in a cosmetic formulation.

These cosmetic formulations are prepared using the previously prepared solutions or emulsions, but they can also be produced directly from the individual constituents.

Cosmetic Formulations:

Cosmetic formulations include, for example:

So-called "rinse-off" products, such as e.g. "2-in-1" shampoos, "body wash" and hair rinses for treatment of hair during and after cleansing or after colouring or treatment of hair before bleaching, curling or straightening, and so-called "leave-in" products, such as hair treatments, care creams, hairdressing creams, hair gels, hair styling products, hair setting compositions, hair sprays, pump sprays, blow-waving compositions and blow-drying setting compositions. The formulations moreover likewise include hair colouring compositions, which can be differentiated into 3 types according to the resistance of the colour result to washing—permanent, semipermanent and temporary hair colouring compositions. The term hair here includes all keratin-containing fibres, but in particular human hair. The hair colouring compositions contain, for example, conventional silicones, surfactants, auxiliary substances and colouring agents, in addition to the polycarbonate- and/or polyurethane-polyorganosiloxane compounds according to the invention. Each of these ingredients can be used either by itself or in combination with further ingredients, and represents additional functions in the formulations which serve to increase the volume, the combability and the shine and to reduce washing out of the colour of and from coloured keratin-containing substrates, such as e.g. human and animal hair, and contain at least one polycarbonate- and/or polyurethane-polyorganosiloxane compound.

The abbreviations mentioned in connection with the cosmetic formulations are explained in the INCI (The Cosmetic, Toiletry and Fragrance Association Washington D.C.).

The silicones included here in addition to the polycarbonate- and/or polyurethane-polyorganosiloxane compounds according to the invention include, for example:

Cyclic, linear and branched polydimethylsiloxanes having a viscosity of 0.65-200,000,000 mPa·s at 25° C. and mixtures thereof, such as e.g. octaorganocyclotetrasiloxanes, octamethylcyclotetrasiloxanes, decaorganocyclopentasiloxanes and dodecaorganocyclohexasiloxanes, wherein the organic radical preferably denotes methyl, such as SF 1173, SF 1202, SF 1217, SF 1204 and SF 1258 from Momentive Performance Materials, formerly GE Bayer Silicones, dimethicones, such as the Baysilone M oils (M3 to M 2,000,000), SE 30, SF 1214, SF 1236, SF 1276 and CF 1251 from GE Bayer Silicones/ Momentive Performance Materials, and dimethiconols, such as Baysilone, SiOH-terminated "gums" from GE Bayer Silicones/Momentive Performance Materials and DC 1501 and DC 1503 from Dow Corning.

The use of the polydimethylsiloxanes described above in the form of nonionic, anionic and cationic emulsions, such as e.g. SM 2169, SM 2785, SM 555, SM 2167 and SM 2112 from GE Bayer Silicones/Momentive Performance Materials in combination with emulsions of the polycarbonate- and/or polyurethane-polyorganosiloxane compounds according to the invention and/or the use of mixtures and solutions of the polydimethylsiloxanes described above with the polycarbonate- and/or polyurethane-polyorganosiloxane compounds according to the invention is particularly preferred here, since particular properties of hair care products can be derived from these combinations, such as has already been described extensively in the literature for amino-functional silicones known to date (WO 99/44565, WO 99/44567, WO 99/49836, WO 99/53889, WO 97/12594, U.S. Pat. No. 6,028,031, EP 0811371, WO 98/18443, WO 98/43599 and US 2002-0182161).

Solid silicones, so-called MQ resins, such as e.g. SR 1000 from GE Bayer Silicones/Momentive Performance Materials, and solutions thereof in solvents, such as the abovementioned silicones and aliphatic solvents, such as e.g. isododecane, are likewise suitable.

Organofunctional silicones, such as alkyl-, aryl-, arylalkyl-, phenyl-, fluoroalkyl-, and polyether-modified silicones, such as the types SF 1632, SF 1642, SF 1555, Baysilone CF 1301, Baysilone PK 20, FF 157, SF 1188A, SF 1288 and SF 1388 from GE Bayer Silicones/Momentive Performance Materials are likewise suitable.

Surfactants:

Surfactants as ingredients of cosmetic formulations are described in A. Domsch: Die kosmetischen Präparate, Verlag für Chem. Industrie, 4th edition, 1992, in Kosmetikjahrbuch 1995, Verlag für chemische Industrie, 1995, and H. Stache, Tensidtaschenbuch, 2nd edition, Carl Hanser Verlag, 1981.

Anionic Surfactants:

By way of example but without being limited thereto, the following anionic surfactants are suitable as a constituent of the formulations:

Alkyl sulfates, alkyl ether-sulfates, alkaryl sulfates, olefinsulfonates, alkylamide ether-sulfates, acyl isethionates, acyl glutamates, alkyl ether-carboxylates, methyl taurides and taurides, sarcosides, sulfosuccinates, protein-fatty acid condensates, alkyl phosphates and alkyl ether-phosphates. The free acids and alkali metal salts and magnesium, ammonium and mono-, di- and triethanolamine salts thereof can be used here.

The alkyl and acyl groups typically contain 8-18 C atoms and can be unsaturated. The alkyl ether-sulfates, alkylamide ether-sulfates, alkyl ether-carboxylates and alkyl ether-phosphates can contain 1-10 ethylene oxide or propylene oxide units or a combination of ethylene oxide and propylene oxide units.

Amphoteric Surfactants:

By way of example but without being limited thereto, the following amphoteric surfactants are suitable as a constituent of the formulations:

Alkylbetaines, alkylamidobetaines, sulfobetaines, acetates and diacetates, imidazolines, propionates and alkylamine oxides.

The alkyl and acyl groups here contain 8-19 C atoms.

Nonionic Surfactants:

By way of example but without being limited thereto, the following nonionic surfactants are suitable as a constituent of the formulations:

Alkyl ethoxylates, aryl ethoxylates, ethoxylated esters, polyglycolamides, polysorbates, glycerol fatty acid ethoxylates, alkylphenol polyglycol ethers and sugar surfactants, such as e.g. alkyl glycosides.

Cationic Surfactants:

In the case of cationic surfactants, a distinction is made between pure cationic surfactants and cationic polymers.

Pure Cationic Surfactants:

By way of example but without being limited thereto, the following nonionic surfactants are suitable as a constituent of the formulations:

Monoalkylquats, dialkylquats, trialkylquats, tetraalkylquats, benzylammonium salts, pyridine salts, alkanolammonium salts, imidazoline salts, oxazoline salts, thiazoline salts, salts of amine oxides and sulfone salts, wherein the term "quat" implies the presence at least of one quaternary ammonium group.

Cationic Polymers:

For "2-in-1" shampoos in particular, cationically modified polymers are also employed, in addition to the pure cationic surfactants. A comprehensive description of these polymers is given in U.S. Pat. No. 5,977,038 and WO 01-41720 A1. Cationic polyacrylamides, cationic protein derivatives, hydroxyalkylcellulose ethers and cationic guar derivatives are preferred here. Cationic guar derivatives with the CTFA name Guar Hydroxypropyltrimonium Chloride are particularly preferred. These types are obtainable under the trade names Cosmedia Guar C 261 (Henkel), Diagum P 5070 (Diamalt) and Jaguar C types and Jaguar EXCEL from Rhodia.

Auxiliary Substances:

Auxiliary substances as ingredients in particular of cosmetic formulations are described in: A. Domsch, Die kosmetischen Präparate, Verlag für Chem. Industrie, 4th edition, 1992; and in: Kosmetikjahrbuch 1995, Verlag für Chemische Industrie, 1995.

By way of example but without being limited thereto, the following auxiliary substances are suitable as a constituent of the formulations:

Inorganic and organic acids, bases and buffers, salts, alcohols, such as e.g. ethanol, isopropanol, ethylene glycol, polyethylene glycol, propylene glycol, polypropylene glycol, glycol ethers and glycerol, thickeners, stabilizers for emulsions, such as e.g. xanthan gum, re-oiling agents, preservatives, foam stabilizers, defoamers, pearlescent and opacifying agents, such as e.g. glycol distearates and titanium dioxide, collagen hydrolysate, keratin hydrolysate, silk hydrolysate, antidandruff active compounds, such as e.g. zinc pyrithione, salicylic acid, selenium disulfide, sulfur and tar preparations, polymeric emulsifiers, vitamins, dyestuffs, UV filters, bentonites, perfume oils, fragrances, styling polymers, moisturizers, plant extracts and further natural or nature-identical raw materials.

It is known that by the addition of oil- and water-soluble UV filters or combinations of UV filters in cosmetic formulations for care and treatment of keratin-containing substrates, such as human and animal hair, the degradation of dyestuffs and therefore the bleaching out and fading of coloured keratin-containing substrates by UV radiation can be reduced decisively or even prevented completely.

Ingredients for Hair Colouring Compositions:

Dyestuffs and other ingredients of hair colouring compositions are described in: A. Domsch, Die kosmetischen Präparate, Verlag für Chem. Industrie, 4th edition, 1992. Dyestuffs are described in: Legislation on cosmetic agents (Cosmetics Legislation), Bundesgesetzblatt 1997, part I p. 2412, §3 and annex 3 and in European Community (EC) Directive, 76/68/EEC, annex IV.

In the following, hair colouring compositions are differentiated into permanent, semipermanent and temporary hair colour compositions.

Permanent Hair Colouring Compositions:

Permanent dyeings which are not washed out even by washing the hair several times (more than 10) are formed by chemical reaction between dyestuff precursors under oxidative conditions by hydrogen peroxide. The mixture of the corresponding components determines the colour result which can be achieved here. In the case of the precursors, a distinction is made between oxidation bases (developers) and coupling components (modifiers).

Oxidation Bases:

By way of example but without being limited thereto, the following oxidation bases are suitable as a constituent of the formulations:

m- and p-phenylenediamines (diaminobenzenes), N-substituted derivatives and salts thereof, N-substituted derivatives of o-phenylenediamine, o-, m- and p-toluylenediamines (methyl-diaminobenzenes), N-substituted derivatives and salts thereof, p-amino-diphenylamine and its hydrochloride and sulfate, o-, m- and p-aminophenol and its hydrochloride, 2,4-diaminoisosulfate (4-methoxy-m-phenylenediamine sulfate), o-chloro-p-phenylenediamine sulfate, picramic acid (2,4-dinitro-6-aminophenol) and 2,4-dinitro-1-naphtholsulfonic acid and the sodium salt thereof.

Coupling Components:

By way of example but without being limited thereto, the following coupling components are suitable as a constituent of the formulations:

Hydroquinone (1,4-dihydroxybenzene), resorcinol (1,3-dihydroxybenzene), pyrocatechol (1,2-dihydroxybenzene), α-naphthol (1-hydroxynaphthalene), pyrogallol (1,2,3-trihydroxybenzene) and 2,6-diaminopyridine.

Oxidation bases and coupling components are conventionally incorporated with surfactants into oil-in-water emulsions, but simple solutions or shampoos are also known as formulations. The formulations moreover contain antioxidants, such as e.g. sodium sulfite, sodium dithionite, ascorbic acid or thioglycollic acid, to stabilize the precursors and are adjusted to a pH of between 8 and 12 (preferably 9-11) with alkaline substances, such as e.g. ammonia. Surfactants as wetting agents, complexing agents for heavy metals, fragrances for masking the ammonia smell, conditioners for improving the feel of the hair and for protecting the hair and solvents, such as ethanol, ethylene glycol, glycerol or benzyl alcohol, are moreover added.

Permanent hair colouring compositions are typically on offer as 2-component systems comprising the colour solution, cream or shampoo described above and the developer solution. The developer solution here contains between 6-12% of hydrogen peroxide, and constituents of the formulation containing the colour components can optionally also be added. The peroxide solution here, however, must be thoroughly stabilized.

Semipermanent Hair Colouring Compositions:

Semipermanent colourings were developed to maintain the colouring for 6-10 washes with shampoo. So-called directly-absorbing dyestuffs which essentially belong to the group of nitro, azo and anthraquinone dyestuffs are used here. These dyestuffs are small enough to penetrate into the hair. Formulations which are typically employed are solutions, creams, shampoos or also aerosol foams. The composition is comparable to the formulations containing the colour component which are used as permanent hair colourings.

Temporary Hair Colouring Compositions:

In contrast to the semipermanent hair colouring compositions, temporary colourings, also called tints, contain larger dyestuff molecules which are not capable of penetrating into the hair. They were developed to maintain the colouring for 1-6 washes. Azo and basic dyestuffs and azine and thiazine derivatives are typically employed here. That stated for the semipermanent and permanent hair colouring compositions applies to the composition of the formulations. Dyestuffs and other ingredients of hair colouring compositions are described in: A. Domsch, Die kosmetischen Präparate, Verlag für Chem. Industrie, 4th edition, 1992. Dyestuffs are described in: Legislation on cosmetic agents (Cosmetics Legislation), Bundesgesetzblatt 1997, part I p. 2412, §3 and annex 3 and in European Community (EC) Directive, 76/68/EEC, annex IV.

The following recipes, which do not, however, limit the invention, in which each functional active compound can occur as an individual compound or as a mixture of several compounds have been found to be particularly advantageous for the use of mixtures containing the polycarbonate- and/or polyurethane-polyorganosiloxane compounds according to the invention in cosmetic formulations.

A typical shampoo formulation according to the invention, which does not, however, limit the invention, for care and conditioning of hair comprises the following constituents in % by wt., in each case based on the total formulation:

| | |
|---|---|
| 0.01-10% | polycarbonate- and/or polyurethane-polyorganosiloxane compounds according to the invention |
| 2-15% | anionic surfactant |
| 0-10% | amphoteric surfactant |
| 0-15% | nonionic surfactant |
| 0-10% | cationic surfactant |
| 0-10% | silicone conditioning agents (co-adjuvants) |
| 0-10% | auxiliary substances |
| to 100% | topped up by water. |

A specific shampoo formulation, which does not, however, limit the invention, comprises the following constituents in % by wt.:

| | |
|---|---|
| 0.1-12% | polycarbonate- and/or polyurethane-polyorganosiloxane compounds according to the invention |
| 1-35% | sodium or ammonium lauryl or laureth sulfate (20-30%) |
| 1-6% | cocoamidopropylbetaine (25-35%) |
| 0-3% | guar hydroxypropyltrimonium chloride |
| 0-5% | polyquaternium-10 |
| 0-12% | silicone conditioning agents (co-adjuvants) |
| 0.01-1% | disodium EDTA |
| 0.01-1% | phenoxyethynol (and) methylparaben (and) butylparaben (and) ethylparaben (and) propylparaben |
| 0-1% | perfume (fragrance) |
| 0-1% | dyestuffs |
| 0-1% | citric acid |
| 0-2% | sodium chloride |
| to 100% | topped up by water. |

A typical hair rinse according to the invention, which does not, however, limit the invention, for care and conditioning of hair comprises the following constituents in % by wt.:

| | |
|---|---|
| 0.1-15% | polycarbonate- and/or polyurethane polyorganosiloxane compounds according to the invention |
| 0-10% | amphoteric surfactant |
| 0.1-15% | nonionic surfactant |
| 0-10% | cationic surfactant |
| 0-15% | silicone conditioning agents (co-adjuvants) |
| 0-20% | auxiliary substances |
| to 100% | topped up by water. |

A specific composition of a hair rinse, which does not, however, limit the invention, comprises the following constituents in % by wt.:

| | |
|---|---|
| 0.5-15% | polycarbonate- and/or polyurethane-polyorganosiloxane compounds according to the invention (as a 43.5% strength emulsion in water with nonionic emulsifiers) |
| 0-15% | silicone conditioning agents (co-adjuvants) |
| 0-10% | cetrimonium chloride (25-35%) |
| 0-3% | guar hydroxypropyltrimonium chloride |
| 1-10% | cetearyl alcohol |
| 0-10% | glycerol |
| 0.01-1% | phenoxyethynol (and) methylparaben (and) butylparaben (and) ethylparaben (and) propylparaben |
| 0-1% | perfume (fragrance) |
| 0-1% | dyestuffs |
| 0-1% | citric acid |
| to 100% | topped up by water. |

A typical hair care treatment according to the invention, which does not, however, limit the invention, for care and conditioning of hair comprises the following constituents in % by wt.:

| | |
|---|---|
| 0.4-20% | polycarbonate- and/or polyurethane-polyorganosiloxane compounds according to the invention |
| 0-15% | nonionic surfactant |
| 0-10% | cationic surfactant |
| 0-20% | silicone conditioning agents (co-adjuvants) |
| 0-20% | auxiliary substances |
| to 100% | topped up by water. |

A specific hair care treatment, which does not, however, limit the invention, comprises the following constituents in % by wt.:

| | |
|---|---|
| 1-20% | polycarbonate- and/or polyurethane-polyorganosiloxane compounds according to the invention (as a 43.5% strength emulsion in water with nonionic emulsifiers) |
| 0.5-10% | stearyl alcohol (and) steareth-7 (and) steareth-10 |
| 0-20% | silicone conditioning agents (co-adjuvants) |
| 0-10% | cetrimonium chloride (25-35%) |
| 0-3% | guar hydroxypropyltrimonium chloride |
| 0-5% | dimethicone |
| 0-5% | paraffin oil |
| 1-10% | stearyl alcohol |
| 0-10% | glycerol |
| 0.01-1% | phenoxyethynol (and) methylparaben (and) butylparaben (and) ethylparaben (and) propylparaben |
| 0-1% | perfume (fragrance) |
| 0-1% | dyestuffs |
| 0-1% | citric acid |
| 0-2% | sodium chloride |
| to 100% | topped up by water. |

A quite specific hair care treatment, which does not, however, limit the invention, comprises the following constituents in % by wt.:

| | |
|---|---|
| 2-5% | polycarbonate- and/or polyurethane-polyorganosiloxane compounds according to the invention (as a 43.5% strength emulsion in water with nonionic emulsifiers) |
| 0-5% | silicone conditioning agents (co-adjuvants) |
| 0-2% | cetrimonium chloride (25-35%) |
| 0.5-5% | glycerol |
| 0.25-2.5% | propylene glycol |
| 0.05-0.2% | perfume |
| 0.1-0.5% | polysorbate 20 |
| to 100% | topped up by water. |

A typical dyestuffs-containing formulation according to the invention, which does not, however, limit the invention, for temporary, semipermanent or permanent hair colouring, care and conditioning of hair comprises the following constituents in % by wt.:

| | |
|---|---|
| 0.1-10% | polycarbonate- and/or polyurethane-polyorganosiloxane compounds according to the invention |
| 1-10% | hair dyestuff precursors or dyestuffs according to the desired hair colour |
| 0-15% | anionic surfactant |
| 0-10% | amphoteric surfactant |
| 0-10% | nonionic surfactant |
| 0-10% | cationic surfactant |
| 0-1% | sodium sulfite |
| 0-5% | buffer |
| 0-10% | silicone conditioning agents (co-adjuvants) |
| 0-10% | auxiliary substances |
| to 100% | water. |

A specific colour cream according to the invention, which does not, however, limit the invention, for permanent hair colouring comprises the following constituents in % by wt.:

| | |
|---|---|
| 0.1-10% | polycarbonate- and/or polyurethane-polyorganosiloxane compounds according to the invention (as a 20% strength emulsion in water with nonionic emulsifiers) |
| 1-5% | hair colour precursors or dyestuffs according to the desired hair colour |
| 2-15% | anionic surfactant |
| 0-10% | amphoteric surfactant |
| 0-10% | nonionic surfactant |
| 0-10% | cationic surfactant |
| 0.1-1% | sodium sulfite |
| 0.1-5% | buffer for pH = 8-12 |
| 0-10% | silicone conditioning agents (co-adjuvants) |
| 0-10% | auxiliary substances |
| to 100% | water. |

A specific colour solution according to the invention, which does not, however, limit the invention, for permanent hair colouring comprises the following constituents in % by wt.:

| | |
|---|---|
| 0.1-10% | polycarbonate- and/or polyurethane-polyorganosiloxane compounds according to the invention (as a 20% strength emulsion in water with nonionic emulsifiers) |
| 1-5% | hair colour precursors or dyestuffs according to the desired hair colour |
| 0.1-1% | sodium sulfite |
| 5-15% | propylene glycol |
| 5-15% | ammonia (28%). |
| 10-30% | oleic acid |
| 5-15% | isopropanol |
| 10-30% | alkanolamide |
| 0-10% | silicone conditioning agents (co-adjuvants) |
| to 100% | water. |

A typical developer formulation according to the invention, which does not, however, limit the invention, for permanent hair colouring comprises the following constituents in % by wt.:

| | |
|---|---|
| 0.1-10% | polycarbonate- and/or polyurethane-polyorganosiloxane compounds according to the invention |
| 10-30% | hydrogen peroxide (30%) |
| 0-15% | anionic surfactant |
| 0-10% | amphoteric surfactant |
| 0-10% | nonionic surfactant |
| 0-10% | cationic surfactant |
| 0-5% | buffer or acid for pH = 2-6 |
| 0-10% | silicone conditioning agents (co-adjuvants) |
| 0-10% | auxiliary substances |
| to 100% | water |

A specific developer cream according to the invention, which does not, however, limit the invention, for permanent hair colouring comprises the following constituents in % by wt.:

| | |
|---|---|
| 0.1-5% | polycarbonate- and/or polyurethane-polyorganosiloxane compounds according to the invention (as a 20% strength emulsion in water with nonionic emulsifiers) |
| 10-30% | hydrogen peroxide (30%) |
| 0-5% | silicone conditioning agents (co-adjuvants) |
| 1-10% | cetearyl alcohol |
| 0.5-5% | trideceth-2 carboxamide MEA |
| 0.5-5% | ceteareth-30 |
| 0.5-5% | glycerol |
| 0.05-2% | pentasodium pentetate (pentasodium diethylenetriamine-pentaacetate |
| 0.05-2% | sodium stannate |
| 0.05-2% | tetrasodium pyrophosphate |
| to 100% | water. |

It has been found here that the solutions or mixtures according to the invention are preferably suitable for the preparation of cosmetic formulations, such as for the treatment, conditioning, cleansing and/or care of coloured substrates or substrates which are to be coloured.

That is to say, the formulations containing at least one polycarbonate- and/or polyurethane-polyorganosiloxane compound according to the invention can be employed in particular for cleansing, care and conditioning of fibrous or planar substrates and if these are coloured and the colour impression thereof is to be largely retained.

The formulations containing at least one polycarbonate- and/or polyurethane-polyorganosiloxane compound according to the invention can furthermore serve for the cleansing, care and the treatment and the conditioning of keratin-containing substrates, since they are suitable as cleansing compositions for wool, for waxes and/or increasing the volume and/or the combability and/or the shine and/or for reducing the washing out of colour from and out of keratin-containing substrates which are coloured or from keratin-containing substrates which are simultaneously to be coloured, such as e.g. human and animal hair.

The formulations containing at least one polycarbonate- and/or polyurethane-polyorganosiloxane compound according to the invention can furthermore be used in particular for the cleansing, care and the treatment, cleansing and care of keratin-containing fibres or hair before, during and/or after the colouring operation, since the hair colouring compositions formulated with these lead simultaneously to an improvement in the softness and/or to a reduction in the wet and dry combing forces and/or to an increase in the shine and/or to an increase in the hair volume and/or to a reduction in the washing out of dyestuffs from and out of tinted and coloured hair.

Softener Formulations

With respect to the presentation farm, on the one hand it is possible to incorporate the polycarbonate- and/or polyurethane-polyorganosiloxane compounds according to the invention into non-transparent softener dispersions or softener emulsions or transparent microemulsions or solutions.

Typical further components for such non-transparent or transparent formulations are:

- quaternary ammonium compounds, preferably quaternary ammonium compounds containing alkanoic acid ester units as softeners,
- organic solvents, preferably mono- and polyhydric alcohols, such as ethanol, 2-propanol, ethylene glycol, 1,2-propylene glycol, hexylene glycol, dipropylene glycol, esters and ethers of glycols and oligoglycols, such as dipropylene glycol monobutyl ether, tripropylene glycol monomethyl ether, diethylene glycol diacetate, to improve the solubility and transparency of the formulation,
- diols and higher alcohols of longer-chain hydrocarbons, for example 2,2,4-trimethyl-1,3-pentanediol, to increase the solubilizability of the softener components,
- nonionic surfactants, preferably alkoxylates of branched or unbranched $C_8$ to $C_{40}$ alcohols and fatty acid esters of alkylene oxides, for stabilizing emulsions or preparation of microemulsions
- perfumes
- viscosity regulators
- dyestuffs
- preservatives.

The additional functional components listed and preferred representatives are known, for example, from U.S. Pat. No. 6,376,455.

On the other hand, it is possible to apply the polycarbonate- and/or polyurethane-polyorganosiloxane compounds according to the invention to solid carriers in the context of laundry freshener systems, and then to bring these into contact, in the laundry dryer, with textiles which are to be freshened and/or softened. Laundry freshener systems on carriers and functional components thereof are known, for example, from U.S. Pat. No. 4,824,582, U.S. Pat. No. 4,808,086, U.S. Pat. No. 4,756,850, U.S. Pat. No. 4,749,596 and U.S. Pat. No. 3,686,025.

Typical components for such laundry freshener systems on carriers are:

- fatty amines or complexes thereof with anionic surfactants, as conditioning agents
- quaternary ammonium compounds, preferably quaternary ammonium compounds containing alkanoic acid ester units, as softeners,
- nonionic softeners, for example based on sorbitan esters, fatty alcohol alkoxylates
- "soil release agents", for example based on cellulose ethers, guar gum, terephthalic acid block copolymers.

The carrier material is a sponge-like or porous sheet-like material which has a sufficient capacity for uptake of the laundry freshener formulation. "Woven" and "nonwoven" materials are employed. The materials are based on natural or synthetic polymers, such as wool, cotton, sisal, linen, cellulose esters, polyvinyl compounds, polyolefins, polyamides, polyurethanes and polyesters.

The invention furthermore relates to a reactive composition comprising at least one compound of the formula (10)

(10)

wherein ST is $ST^1$ or $ST^2$, which are as defined above, and Y is $Y^1$ or $Y^2$, which are as defined above, and $ST^5$ and $ST^6$ are as defined above, and at least one compound of the formula

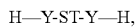

H—Y-ST-Y—H, wherein $ST=ST^1$ or $ST^2$, which are as defined above, and Y is as defined above, with the proviso that at least one of the radicals ST comprises a polyorganosiloxane radical, In a preferred embodiment of the reactive composition of the invention, $Y=NR^2$, wherein $R^2$ is as defined above, preferably hydrogen, and $ST^5$ and $ST^6$ are each —$CH_2$—.

The invention furthermore relates to a reactive composition comprising at least one compound of the formula (13)

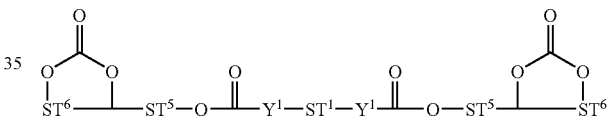

(13)

wherein $ST^5$, $ST^6$, $Y^1$ and $ST^1$ are as defined above, at least one compound of the formula

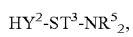

$HY^2$-$ST^3$-$NR^5{}_2$, wherein $ST^3$, $Y^2$ and $R^5$ are as defined above, and at least one compound of the formula

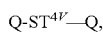

Q-$ST^{4V}$—Q, wherein Q is a radical which is capable of alkylation of an amino group and $ST^{4V}$, together with the molecular part originating from Q after the quaternization reaction, forms the radical $ST^4$, with the proviso that at least one of the radicals $ST^1$, $ST^3$ and/or $ST^4$ comprises a polyorganosiloxane radical.

In the abovementioned reactive composition, $ST^5$ and $ST^6$ are each preferably —$CH_2$—, $Y^1$ and $Y^2$ are preferably independently of each other $NR^2$, wherein $R^2$ is as defined above, preferably hydrogen.

The invention furthermore relates to a cured composition which is obtained by curing the reactive compositions described above. In this procedure, a coating and elastomeric shaped article can be formed in particular.

The cured compositions mentioned can be cured in particular by heating and/or addition of a catalyst. In this context, the reactive compositions can be employed in particular as a 1C (component) composition or, less preferably, as a 2C (component) composition.

The invention furthermore relates to the novel compound of the formula (12)

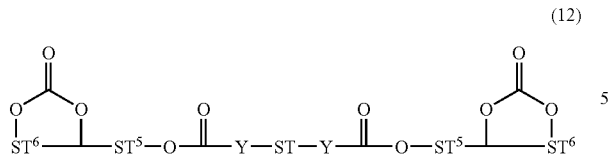

(12)

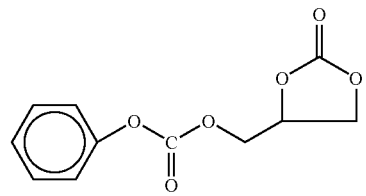

wherein ST is ST¹ or ST², which are as defined above, and Y is Y¹ or Y², which are as defined above, and ST⁵ and ST⁶ are as defined above, with the proviso that the radical ST comprises at least one polyorganosiloxane radical, which can be used in the reactive compositions.

In the said compound, ST is preferably ST¹, which is as defined above, ST⁵ and ST⁶ are each preferably —CH₂—, Y is preferably Y¹, which is preferably NR², wherein R² is as defined above, preferably hydrogen.

By the use of such more highly functionalized compounds in which ST is in particular a tri- or tetravalent radical, branching/crosslinking of the polycarbonate- and/or polyurethane-polyorganosiloxane compound takes place. Various use parameters, such as e.g. hardness and elasticity, can be established in particular by this route.

49 g of an aminosiloxane of the structure

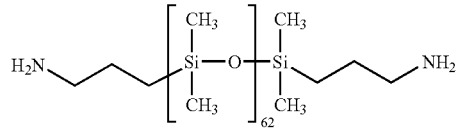

and 15 g of 1-butanol are mixed in a flask under an N₂ atmosphere and the mixture is heated at 120° C. for 9 hours, during which it reacts, with phenol being split off, to give a reaction mixture which contains the compound of the formula:

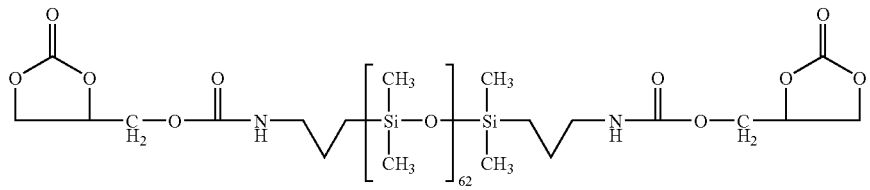

The present invention is illustrated further by the following examples.

EXAMPLES

Example 1

5.2 g (0.022 mol) of a phenol ester of the structure 2.04 g (0.02 mol) of H₂NCH₂CH₂CH₂N(CH₃)₂ are then added and the mixture is heated at 120° C. for a further 9 hours.

Finally, 2.59 g (0.01 mol) of an ester of the structure

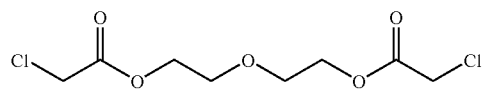 [SMILES: O=C(CCl)OCCOCCOC(=O)CCl]

are added dropwise and the mixture is stirred at 120° C. for a further 18 hours.

As a result of the reaction, in addition to the phenol as the product split off, a polymer is obtained which contains the following structural element:

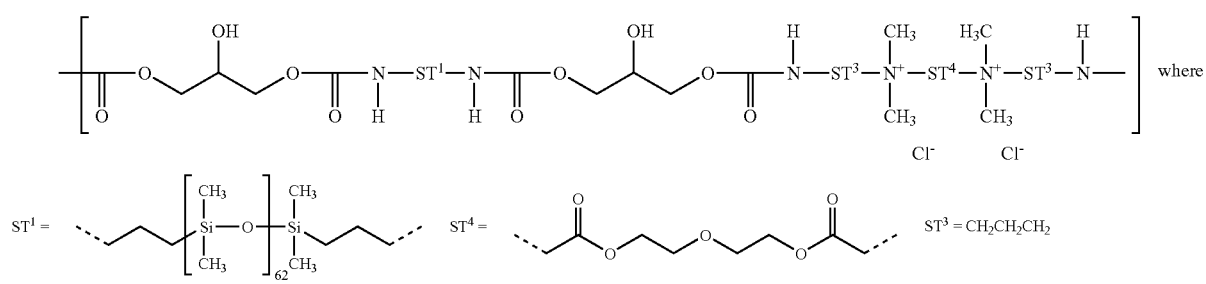

Example 2

7.36 g (8.04 mmol) of a carbonate-terminated polyalkylene oxide derivative of the structure

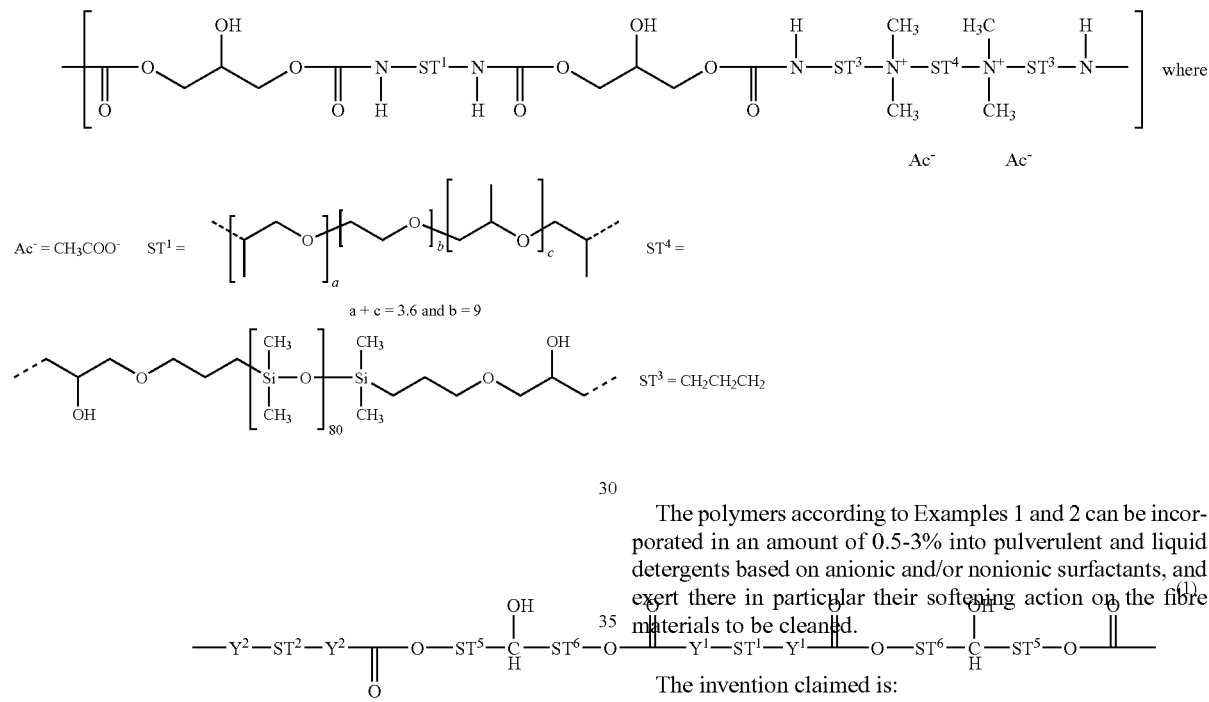

where a+c=3.6 and b=9,
prepared from

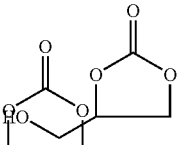

COCl$_2$ and Jeffamin ED 600 (Huntsman Corp.), 1.69 g (16.1 mmol) of H$_2$NCH$_2$CH$_2$CH$_2$N(CH$_3$)$_2$ and 61 g of propylene glycol monomethyl ether are initially introduced into a flask under an N$_2$ atmosphere and the mixture is heated at 116-118° C. for 15 hours, while stirring.

A mixture comprising 50 g (8.04 mmol) of an epoxysiloxane of the structure

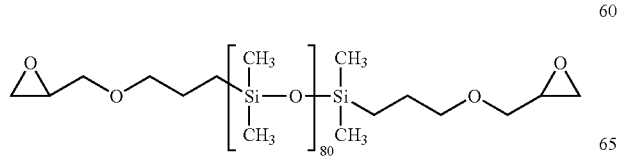

1 g of deionized water and 0.97 g (16.1 mmol) of acetic acid is then added. The total mixture is heated at 116-120° C. for 10 hours.

As a result of the reaction, a polymer is obtained which contains the following structural element:

The polymers according to Examples 1 and 2 can be incorporated in an amount of 0.5-3% into pulverulent and liquid detergents based on anionic and/or nonionic surfactants, and exert there in particular their softening action on the fibre materials to be cleaned.

The invention claimed is:

1. A polycarbonate- and/or polyurethane-polyorganosiloxane compound containing at least one structural element of the formula (1):

wherein
Y$^1$ and Y$^2$ are independently chosen from —O—, —S— and —NR$^2$—, wherein
R$^2$ is hydrogen or a straight-chain, cyclic or branched, saturated, unsaturated or aromatic hydrocarbon radical having up to 40 carbon atoms, which can contain one or more groups chosen from —O—, —C(O)—, —NH— and —NR$^3$—, wherein R$^3$ is a straight-chain, cyclic or branched, saturated, unsaturated or aromatic hydrocarbon radical having up to 40 carbon atoms, which can contain one or more groups chosen from —O—, —C(O)— and —NH—, and
ST$^1$ and ST$^2$ are independently chosen from divalent to more than divalent, straight-chain, cyclic or branched, saturated or aromatic, substituted or unsubstituted hydrocarbon radicals having up to 1,000 carbon atoms, which can contain one or more groups chosen from —O—, —C(O)—, —NH—, —NR$^3$—,

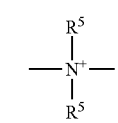

and a polyorganosiloxane unit having 2 to 1,000 silicon atoms, wherein

R[5] is a straight-chain, cyclic or branched, saturated, unsaturated or aromatic hydrocarbon radical having up to 100 carbon atoms, which can contain one or more groups chosen from —O—, —C(O)— and —NH—, or R[5] is a divalent radical which forms cyclic structures within the radicals ST[1] and ST[2], or one or both of the radicals Y[1] adjacent to ST[1], with ST[1], and/or one or both of the radicals Y[2] adjacent to ST[2], with ST[2], can in each case form a nitrogen-containing heterocyclic radical, and wherein if a plurality of radicals ST[1] is present, these can be identical or different, and if a plurality of radicals ST[2] is present, these can be identical or different, ST[5] is an optionally substituted, divalent, straight-chain, cyclic or branched, saturated or unsaturated hydrocarbon radical having 1 to 12 carbon atoms, ST[6] is an optionally substituted, divalent, straight-chain, cyclic or branched, saturated or unsaturated hydrocarbon radical having 1 to 12 carbon atoms, with the proviso that ST[1] comprises a polyorganosiloxane radical, and wherein ST[2] represents a radical of the formula

-ST[3]-N[+](R[5])$_2$-ST[4]-N[+](R[5])$_7$-ST[3]- wherein

ST[3] is a straight-chain or cyclic or branched, saturated or unsaturated or aromatic, substituted or unsubstituted hydrocarbon radical having to 2 to 100 carbon atoms, which can be substituted by —O—, —C(O)—, —NH—, —NR[3]—, wherein R[3] is as defined above, and ST[4] is a straight-chain or cyclic or branched, saturated or unsaturated or aromatic, substituted or unsubstituted hydrocarbon radical having to 2 to 100 carbon atoms, which can be substituted by —O—, —C(O)—, —NH—, —NR[3]— and by a polyorganosiloxane unit having 2 to 200 silicon atoms, wherein R[3] is as defined above, or acid addition compounds and/or salts thereof of the compound of formula (1).

2. The compound of claim 1, wherein ST[5] and ST[6] are each —CH$_2$—, so that the formula (1) has the following structure:

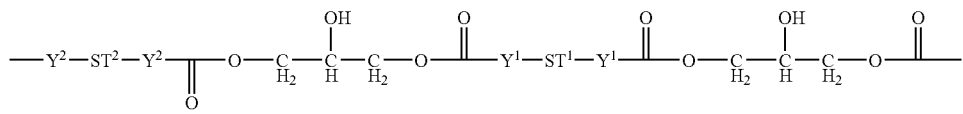

wherein

Y[1], ST[1] and ST[2] are as defined above.

3. The compound of claim 1, wherein the compound is linear and wherein ST[1] and ST[2] are in each case divalent radicals.

4. The compound of claim 1, wherein the compound is branched, and wherein at least one of the radicals ST[1] or ST[2] is tri- or tetravalent.

5. The compound of claim 1, further comprising at least one polyorganosiloxane structural element of the formula (2):

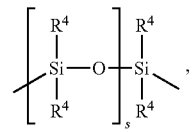

wherein

R[4] is a straight-chain, cyclic or branched, saturated, unsaturated or aromatic hydrocarbon radical having up to 20 C atoms, and s=1 to 999.

6. The compound of claim 1, wherein the compound comprises at least two structural elements of the formula (1).

7. The compound of claim 1, wherein the compound comprises at least two polyorganosiloxane structural elements of the formula (2):

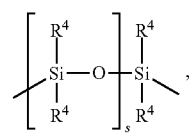

wherein

R[4] is a straight-chain, cyclic or branched, saturated, unsaturated or aromatic hydrocarbon radical having up to 20 C atoms, and s=1 to 999.

8. The compound of claim 1, wherein Y[1]=—NR—, and wherein R[2] is as defined above.

9. The compound of claim 1, wherein Y[1] and Y[2]=—NR[2]—, and wherein R[2] is as defined above.

10. The compound of claim 1, wherein Y[1] and Y[2]=—NH—.

11. The compound of claim 1, wherein the compound is linear and wherein ST[1] is the same as ST[2] and these are in each case divalent.

12. The compound of claim 1, wherein ST[1] is different from ST[2].

13. The compound of claim 1, wherein ST[1] is

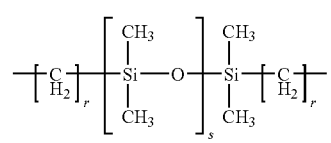

wherein s is 1 to 199, and r=1 to 12.

14. The compound of claim 1, having the following formula:

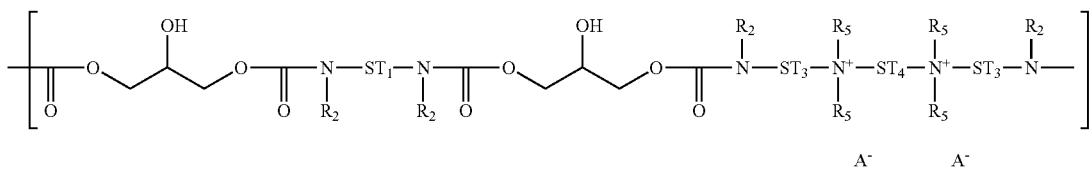

wherein

A⁻ is an organic or inorganic anion, with the proviso that at least one of the radicals $ST^1$, $ST^3$ and $ST^4$ contains a polyorganosiloxane unit.

15. The compound of claim 1, wherein $ST^1$ is selected from the group consisting of:
  divalent, straight-chain hydrocarbon radicals having up to 15 carbon atoms,
  divalent, mono- or polycyclic hydrocarbon radicals having up to 15 carbon atoms,
  divalent, aromatic hydrocarbon radicals having up to 15 carbon atoms, and
  radicals which are divalent or more than divalent and are derived from primary and secondary amino-functionalized prepolymers.

16. A method of preparing a composition useful as coatings, agents for modification of surfaces, elastomers, thermosets, adhesives, primers for metal and plastics surfaces, polymer additives, detergent additives, rheological agents, cosmetics and agents for modification of fibres, the method including providing the compound of claim 1.

17. A formulation comprising at least one compound according to claim 1, the formulation useful as a detergent, cosmetic or fiber treatment.

18. A polycarbonate- and/or polyurethane-polyorganosiloxane compound containing at least one structural element of the formula (1):

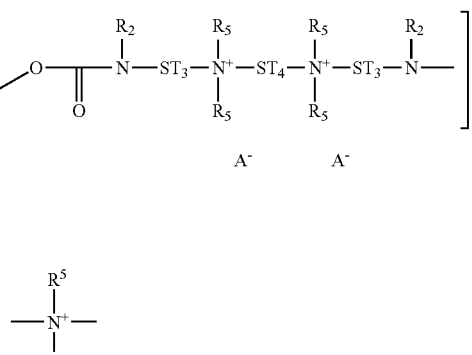

and a polyorganosiloxane unit having 2 to 1,000 silicon atoms, wherein $R^5$ is a straight-chain, cyclic or branched, saturated, unsaturated or aromatic hydrocarbon radical having up to 100 carbon atoms, which can contain one or more groups chosen from —O—, —C(O)— and —NH—, or $R^5$ is a divalent radical which forms cyclic structures within the radicals $ST^1$ and $ST^2$, or one or both of the radicals $Y^1$ adjacent to $ST^1$, with $ST^1$, and/or one or both of the radicals $Y^2$ adjacent to $ST^2$, with $ST^2$, can in each case form a nitrogen-containing heterocyclic radical, and wherein if a plurality of radicals $ST^1$ is present, these can be identical or different, and if a plurality of radicals $ST^2$ is present, these can be identical or different, $ST^5$ is an optionally substituted, divalent, straight-chain, cyclic or branched, saturated or unsaturated hydrocarbon radical having 1 to 12 carbon atoms, $ST^6$ is an optionally substituted, divalent, straight-chain, cyclic or branched, saturated or unsaturated hydrocarbon radical having 1 to 12 carbon atoms,

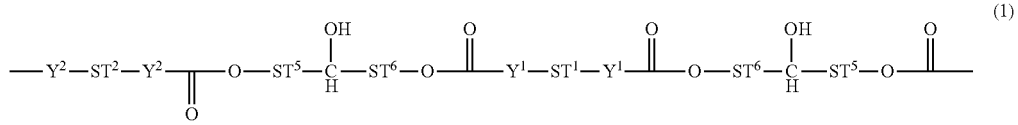

wherein $Y^1$ and $Y^2$ are independently chosen from —O—, —S— and —NR²—, wherein $R^2$ is hydrogen or a straight-chain, cyclic or branched, saturated, unsaturated or aromatic hydrocarbon radical having up to 40 carbon atoms, which can contain one or more groups chosen from —O—, —C(O)—, —NH— and —NR³—, wherein $R^3$ is a straight-chain, cyclic or branched, saturated, unsaturated or aromatic hydrocarbon radical having up to 40 carbon atoms, which can contain one or more groups chosen from —O—, —C(O)— and —NH—, and $ST^1$ and $ST^2$ are independently chosen from divalent to more than divalent, straight-chain, cyclic or branched, saturated, unsaturated or aromatic, substituted or unsubstituted hydrocarbon radicals having up to 1,000 carbon atoms, which can contain one or more groups chosen from —O—, —C(O)—, —NH—, —NR³—, wherein $ST^1$ represents a radical which contains a polyalkylenoxy group and $ST^2$ represents a radical which contains a polyorganosiloxane group.

19. The compound of claim 18, wherein the compound comprises at least one selected from the group consisting of amino groups, protonated amino groups and quaternary ammonium groups.

20. A formulation comprising at least one compound according to claim 18, the formulation useful as a detergent, cosmetic or fiber treatment.

21. A method of preparing a composition useful as coatings, agents for modification of surfaces, elastomers, thermosets, adhesives, primers for metal and plastics surfaces, polymer additives, detergent additives, rheological agents, cosmetics and agents for modification of fibers, the method including providing the compound of claim 18.

* * * * *

UNITED STATES PATENT AND TRADEMARK OFFICE
CERTIFICATE OF CORRECTION

| | |
|---|---|
| PATENT NO. | : 8,410,236 B2 |
| APPLICATION NO. | : 12/601071 |
| DATED | : April 2, 2013 |
| INVENTOR(S) | : Simon et al. |

It is certified that error appears in the above-identified patent and that said Letters Patent is hereby corrected as shown below:

Please delete 8,410,236 in its entirety and insert 8,410,236 in its entirety consisting of Title page and columns 1 through columns 40 as attached.

Signed and Sealed this
Fourth Day of February, 2014

Michelle K. Lee
*Deputy Director of the United States Patent and Trademark Office*

(12) United States Patent
Simon et al.

(10) Patent No.: US 8,410,236 B2
(45) Date of Patent: Apr. 2, 2013

(54) POLYCARBONATE AND/OR POLYURETHANE POLYORGANOSILOXANE COMPOUNDS

(75) Inventors: Walter Simon, Bochum (DE); Karl-Heinz Sockel, Leverkusen (DE); Gunnar Hoffmüller, Leverkusen (DE); Roland Wagner, Bonn (DE); Horst Lange, Bochum (DE)

(73) Assignee: Momentive Performance Materials GmbH, Leverkusen (DE)

(*) Notice: Subject to any disclaimer, the term of this patent is extended or adjusted under 35 U.S.C. 154(b) by 403 days.

(21) Appl. No.: 12/601,071

(22) PCT Filed: May 21, 2008

(86) PCT No.: PCT/EP2008/056260
§ 371 (c)(1), (2), (4) Date: Mar. 25, 2010

(87) PCT Pub. No.: WO2008/142109
PCT Pub. Date: Nov. 27, 2008

(65) Prior Publication Data
US 2010/0210809 A1 Aug. 19, 2010

(30) Foreign Application Priority Data
May 21, 2007 (DE) .................. 10 2007 023 869

(51) Int. Cl.
*C08G 77/26* (2006.01)

(52) U.S. Cl.
USPC .................. 528/26; 528/28; 528/27; 528/38

(58) Field of Classification Search
USPC .................................. 528/26, 27, 28, 38
See application file for complete search history.

(56) References Cited

U.S. PATENT DOCUMENTS

| | | |
|---|---|---|
| 4,833,225 A | 5/1989 | Schaefer et al. |
| 5,606,077 A | 2/1997 | Lersch et al. |
| 7,041,767 B2 | 5/2006 | Lange et al. |
| 2004/0254325 A1 | 12/2004 | Kuepfer et al. |
| 2006/0223939 A1 | 10/2006 | Lange et al. |
| 2006/0237155 A1 | 10/2006 | Wagner et al. |
| 2007/0092656 A1 | 4/2007 | Keul et al. |
| 2009/0142293 A1 | 6/2009 | Wagner et al. |

OTHER PUBLICATIONS

Novi et al., "Ammonium Functionalized Polydimethylsiloxanes: Synthesis and Properties", Macromolecular Chemistry and Physics, Feb. 2006. pp. 273-286.*

Novi et al., "Ammonium-Functionalized Polydimethylsiloxanes: Synthesis and Properties," Macromol. Chem. Phys. 2006, 207, pp. 273-286.

International Search Report for corresponding PCT/EP2008/056260 mailed Aug. 22, 2008, two pages.

* cited by examiner

Primary Examiner — Margaret Moore
(74) Attorney, Agent, or Firm — Rankin, Hill & Clark LLP

(57) ABSTRACT

The invention relates to novel polycarbonate- and/or polyurethane-polyorganosiloxane compounds, processes for their preparation, their use, precursors for their preparation and reactive compositions which contain the precursors.

21 Claims, No Drawings

POLYCARBONATE AND/OR POLYURETHANE POLYORGANOSILOXANE COMPOUNDS

BACKGROUND OF THE INVENTION

1. Field of the Invention

The invention relates to novel polycarbonate- and/or polyurethane-polyorganosiloxane compounds, processes for their preparation, their use, precursors for their preparation and reactive compositions which contain the precursors.

2. Description of Related Art

Siloxane block copolymers containing quaternary ammonium structures are widely known. These can be on the one hand di-block copolymers of the type of siloxane/quaternary ammonium unit (DE 33 40 708, EP 282720, U.S. Pat. No. 6,240,929, U.S. Pat. No. 6,730,766). On the other hand, triblock copolymers which are based on the combination of siloxane/quaternary ammonium unit/polyether block have been developed (WO 02/10256, WO 02/10257, WO 02/10259, WO 2004/090007, WO 03/078504, WO 2004/041912, WO 2004/042136). An essential advantage of these tri-block copolymers is that the structure thereof can be adapted flexibly and within very wide limits to suit concrete product requirements.

It is furthermore known to react siloxanes terminated with amino groups with hydrocarbon-based diisocyanates to give di-block copolymer containing urea groups (US 2006/036055). Analogous urethane derivative have likewise been described (US 2004/087752).

GB 1128642 discloses quaternary ammonium compounds containing urea and urethane groupings. The reaction of amino- or hydroxy-terminated siloxanes with diisocyanates leads to isocyanate-terminated intermediate stages, which then react, for example, with primary-tertiary di- or triamines, after which the tertiary amino group is quaternized. It is possible e.g. to employ oligoethylene glycols as chain lengthening agents, but this leads to a consumption of isocyanate groups, which are then no longer available for the reaction with primary-tertiary diamines. The amount of quaternary ammonium groups which can be introduced consequently drops. A disadvantage of this solution is thus that flexible adaptation of the structure within wide limits to suit the concrete product requirements cannot take place.

It is furthermore known to react carbonate-functionalized siloxanes with hydrocarbons containing primary and secondary amino groups or hydroxyl groups to give silicones or corresponding esters containing urethane groups (U.S. Pat. No. 5,672,338, U.S. Pat. No. 5,686,547, DE 195 05 892).

It has likewise been proposed to use an unsymmetrically substituted carbonate as a linker group for the synthesis of siloxane-modified diquaternary compounds which contain urethane groups (WO 2005/058863).

Finally, the use of these unsymmetrically substituted carbonate "linkers" in the synthesis of polyurethane block copolymers containing siloxane units and with incorporated amine salt units has been described (C. Novi, A. Mourran, H. Keul, M. Möller, Macromol. Chem. Phys. 2006, 207, 273–286). A disadvantage of these compounds is that they only have pH-sensitive charges in the form of amine salts, which results in a reduced substantivity.

It is thus an object of the invention to discover siloxane block copolymers containing polyurethane block copolymers containing quaternary ammonium groups and siloxane units, which on the one hand allow a flexible adaptation of the structure within wide limits to suit the concrete product requirements, and in which on the other hand essential product properties can be influenced under the influence of donor-acceptor interactions by the urethane groups. It is a further object to discover suitable siloxane-containing precursors.

BRIEF SUMMARY OF THE INVENTION

The present invention provides novel polycarbonate- and/or polyurethane-polyorganosiloxane compounds which can react from stable precursors to give the desired polycarbonate- and/or polyurethane-polyorganosiloxane compounds in a targeted manner when used. The novel polycarbonate- and/or polyurethane-polyorganosiloxane compounds can be prepared easily, reliably and in a targeted manner and have novel interesting properties.

DETAILED DESCRIPTION OF THE PREFERRED EMBODIMENTS

The invention relates to novel polycarbonate- and/or polyurethane-polyorganosiloxane compounds containing at least one structural element of the formula (1):

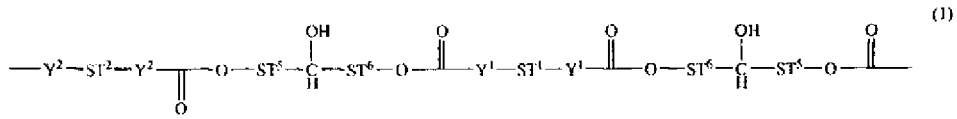

wherein $Y^1$ and $Y^2$ independently of each other are chosen from —O—, —S— and —NR$^2$—, wherein $R^2$=hydrogen or a straight-chain, cyclic or branched, saturated, unsaturated or aromatic hydrocarbon radical having up to 40 carbon atoms, which can contain one or more groups chosen from —O—, —C(O)—, —NH— and —NR$^3$, wherein R$^3$ is as defined above, and $ST^1$ and $ST^2$ independently of each other are chosen from divalent to more than divalent, preferably tetravalent, straight-chain, cyclic or branched, saturated, unsaturated or aromatic, substituted or unsubstituted hydrocarbon radicals having up to 1,000 carbon atoms, which can contain one or more groups chosen from —O—, —C(O)—, —NH—, —NR$^3$—,

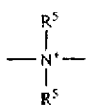

and a polyorganosiloxane unit having 2 to 1,000 silicon atoms, wherein $R^3$ is a straight-chain, cyclic or branched, saturated, unsaturated or aromatic hydrocarbon radical having up to 40 carbon atoms, which can contain one or more groups chosen from —O—, —C(O)— and —NH—, and $R^5$ is a straight-chain, cyclic or branched, saturated, unsaturated or aromatic hydrocarbon radical having up to 100 carbon atoms, which can contain one or more groups chosen from —O—, —C(O)— and —NH—, or $R^5$ is a divalent radical which forms cyclic structures within the radicals $ST^1$ and/or $ST^2$, or one or both of the radicals $Y^1$ adjacent to $ST^1$, with $ST^1$, and/or one or both of the radicals $Y^2$ adjacent to $ST^2$, with $ST^2$, can in each case form a nitrogen-containing heterocyclic radical, and wherein if a plurality of radicals $ST^1$ is present, these can be identical or different, and if a plurality of radicals $ST^2$ is present, these can be identical or different, $ST^5$ is an optionally substituted, divalent, straight-chain, cyclic or branched, saturated or unsaturated hydrocarbon radical having 1 to 12 carbon atoms, $ST^6$ is an optionally substituted, divalent, straight-chain, cyclic or branched, saturated or unsaturated hydrocarbon radical having 1 to 12 carbon atoms, with the proviso that at least one of the radicals $ST^1$ and/or $ST^2$ comprises a polyorganosiloxane radical, or acid addition compounds and/or salts thereof.

According to the invention, the term acid addition compounds means in particular salt-like compounds which are obtained by protonation of basic groups in the molecule, such as, in particular, amino groups optionally present, for example by reaction with inorganic or organic acids.

Salts of the compounds according to the invention result in particular from the formation of compounds containing quaternary ammonium groups, which contain, in particular, radicals

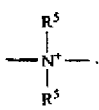

The case wherein one or both of the radicals $Y^1$ adjacent to $ST^1$, with $ST^1$, and/or one or both of the radicals $Y^2$ adjacent to $ST^2$, with $ST^2$, can in each case form a nitrogen-containing heterocyclic radical includes, for example, the case which results in particular from the use of cyclic diamines, such as piperazine, so that the structural element —Y-ST-Y— (where Y=$Y^1$ or $Y^2$ and ST=$ST^1$ or $ST^2$) has, for example, the following structure:

This variant also includes the case where the heterocyclic structure contains only one radical Y, so that —Y-ST-Y— has, for example, the following structure, i.e. piperidine derivatives:

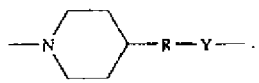

Substituents of the hydrocarbon radicals for $ST^1$ and $ST^2$ include one or more, preferably one to three substituents, which are preferably chosen from the groups which consists of: hydroxyl, halogen, such as fluorine or chlorine, and cyano.

The polyorganosiloxane structural element obligatorily present in the polycarbonate- and/or polyurethane-polyorganosiloxane compounds according to the invention preferably has the formula (2):

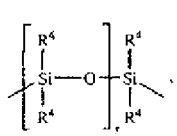

(2)

wherein $R^4$ is a straight-chain, cyclic or branched, saturated, unsaturated or aromatic hydrocarbon radical having up to 20 C atoms, and s=1 to 999.

Preferably:

$R^4$ is a $C_1$ to $C_{20}$, preferably $C_1$ to $C_9$, straight-chain or cyclic or branched, saturated or unsaturated or aromatic hydrocarbon radical, particularly preferably methyl and phenyl, and s is preferably 1 to 199, specifically 1 to 99.

In a particularly preferred case, the siloxane unit has the structure

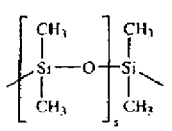

where s is as stated above.

In the polycarbonate- and/or polyurethane-polyorganosiloxane compounds according to the invention, $ST^5$ and $ST^6$ are each —$CH_2$—, so that the formula (1) has the following structure of the formula (3)

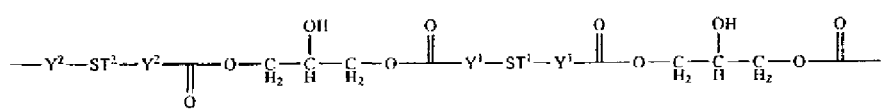

(3)

wherein $Y^1$, $Y^2$, $ST^1$ and $ST^2$ are as defined above.

In a preferred embodiment of the polycarbonate- and/or polyurethane-polyorganosiloxane compounds according to the invention, both $ST^1$ and $ST^2$ are each divalent radicals, so that linear polycarbonate- and/or polyurethane-polyorganosiloxane compounds are formed. Such linear polycarbonate- and/or polyurethane-polyorganosiloxane compounds of the invention are preferably used in those uses where a good miscibility or dispersibility in aqueous media is required. Such uses include, in particular, use as softeners for fibres, in particular in detergents, textile care compositions and textile finishing compositions, and modifying agents for thermoplastics.

However, branched polycarbonate- and/or polyurethane-polyorganosiloxane compounds, wherein at least one of the radicals $ST^1$ or $ST^2$ is trivalent or more than trivalent, preferably tetravalent, so that branched structures with linear recurring structures are formed from structural elements of the formula (1), are also included according to the invention. Such polycarbonate- and/or polyurethane-polyorganosiloxane compounds of the invention containing branched structural elements are required in particular for those uses where thermosetting coatings or elastomers are prepared from the polycarbonate- and/or polyurethane-polyorganosiloxane compounds of the invention.

The polycarbonate- and/or polyurethane-polyorganosiloxane compounds according to the invention contain on average preferably at least two, more preferably at least three structural elements of the formula (1).

The polycarbonate- and/or polyurethane-polyorganosiloxane compounds according to the invention furthermore contain on average at least two, preferably at least three polyorganosiloxane structural elements of the formula (2).

The preferred polycarbonate- and/or polyurethane-polyorganosiloxane compounds according to the invention furthermore preferably contain at least one, more preferably at least two, still more preferably at least three recurring units of the formula (3):

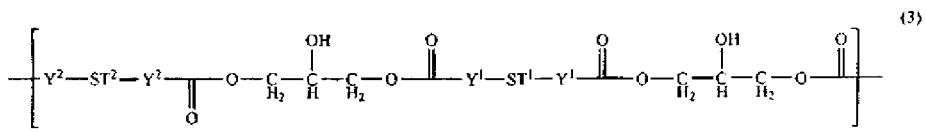

wherein $Y^1$, $Y^2$, $ST^1$ and $ST^2$ are as defined above. The number of recurring units of the formula (1) or (3) present in the polycarbonate- and/or polyurethane-polyorganosiloxane compounds according to the invention can be controlled within wide limits in a manner known per se via the choice of the stoichiometry of the starting compounds.

Depending on the meaning of the radicals $Y^1$ and $Y^2$, the polycarbonate- and/or polyurethane-polyorganosiloxane compounds according to the invention include polyurethane compounds, such as, for example (for $ST^5$ and $ST^6$—$CH_2$—):

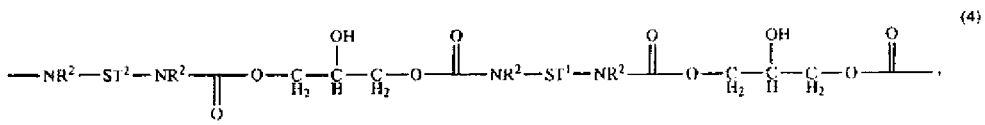

wherein $R^2$ is preferably H and the other variables are as defined above;

polycarbonate compounds, such as, for example (for $ST^5$ and $ST^6$—$CH_2$—):

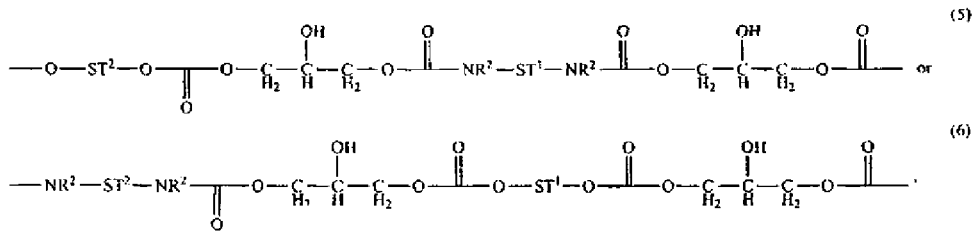

(5)

(6)

wherein $R^2$, $ST^1$ and $ST^2$ are as defined above.

Polycarbonate- and/or polyurethane-polyorganosiloxane compounds wherein $Y^1$ is —$NR^2$—, wherein $R^2$ is as defined above, preferably hydrogen, are preferred according to the invention.

Polyurethane-polyorganosiloxane compounds according to the invention wherein $Y^1$ and $Y^2$ are —$NR^2$—, wherein $R^2$ is as defined above, preferably hydrogen, are furthermore preferred.

Polyurethane-polyorganosiloxane compounds wherein $Y^1$ and $Y^2$ are —NH— are particularly preferred according to the invention.

In a further preferred embodiment of the polycarbonate- and/or polyurethane-polyorganosiloxane compounds according to the invention, these contain amino groups, protonated amino groups and/or quaternary ammonium groups. The presence of quaternary ammonium groups, which serves in particular to establish hydrophilic properties, such as are advantageous in particular in use in aqueous compositions, is particularly preferred. In the compounds according to the invention, the amino groups can also be, in particular, terminal groups.

Linear polycarbonate- and/or polyurethane-polyorganosiloxane compounds wherein the radicals $ST^1$ and $ST^2$ are identical and are in each case divalent are preferred according to the invention.

In a preferred embodiment of the present invention, the radicals $ST^1$ and $ST^2$ can in each case be divalent and identical, and the radicals $Y^1$ and $Y^2$ can also be identical. The compound of the formula (7):

different ($ST^1 \neq ST^2$). This allows a greater flexibility in controlling the properties via the choice of the radicals $ST^1$ and $ST^2$.

In a further preferred embodiment of the invention, the polycarbonate- and/or polyurethane-polyorganosiloxane compounds contains at least one radical $ST^1$ of the following formula (9):

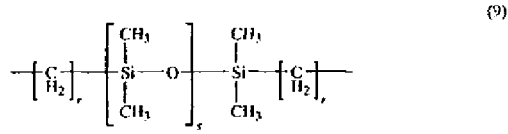

(9)

wherein s is as defined above, r is from 1 to 12, preferably 1 or 3.

In a further preferred embodiment of the invention, the polycarbonate- and/or polyurethane-polyorganosiloxane compounds contain at least one radical $ST^2$ with quaternary groups, of the formula (10):

(10)

wherein $R^5$ is as defined above, $ST^3$ is a straight-chain or cyclic or branched, saturated or unsaturated or aromatic, substituted or unsubstituted hydrocarbon radical having 2 to 100 carbon atoms, which can be substituted by —O—, —C(O)—, —NH—, —$NR^3$—, wherein $R^3$ is as defined above, and

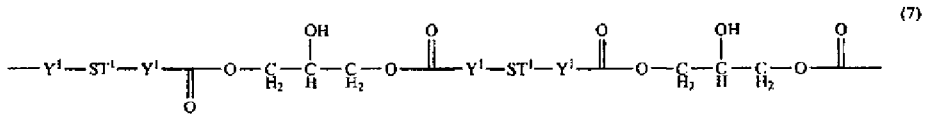

(7)

for example, then results, so that the compound is simplified to recurring units of the formula (8)

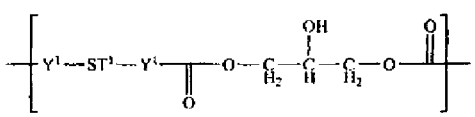

(8)

wherein, according to the invention, at least one radical $ST^1$ must then contain a polyorganosiloxane group.

In an embodiment of the invention which is likewise preferred, the radicals $ST^1$ and $ST^2$ in the polycarbonate- and/or polyurethane-polyorganosiloxane compounds, however, are $ST^4$ is a straight-chain or cyclic or branched, saturated or unsaturated or aromatic, substituted or unsubstituted hydrocarbon radical having to 2 to 100 carbon atoms, which can be substituted by —O—, —C(O)—, —NH—, —$NR^3$— and by a polyorganosiloxane unit having 2 to 200 silicon atoms, wherein $R^3$ is as defined above.

Substituents of the hydrocarbon radicals for $ST^3$ and $ST^4$ include one or more, preferably one to three substituents which are preferably chosen from the group which consists of: hydroxyl, halogen, such as fluorine or chlorine, and cyano. In this context, hydroxyl is particularly preferred, in particular for $ST^4$.

The polycarbonate- and/or polyurethane-polyorganosiloxane compound of the following recurring units accordingly represents a preferred embodiment of the invention:

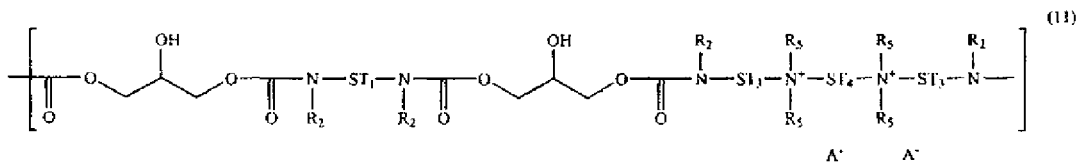

(11)

wherein
$ST^1$, $ST^3$, $ST^4$, $R^2$ and $R^5$ are as defined above, and
$A^-$ is an organic or inorganic anion,
with the proviso that at least one of the radicals $ST^1$, $ST^3$ and $ST^4$ contains a polyorganosiloxane unit. The hydrocarbon radicals $ST^1$ are in particular structures which are derived directly from primary and secondary amines or alcohols which are difunctional or of higher functionality.

Particularly preferred difunctional structures $ST^1$ are:
divalent, straight-chain hydrocarbon radicals having up to 15 carbon atoms, for example hexamethylene,
divalent, cyclic hydrocarbon radicals having up to 15 carbon atoms, for example based on bis-cyclohexylmethane structures

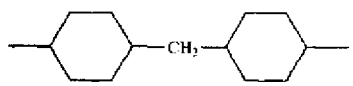

or piperazine or commercially available bis-secondary amines, such as Jefflink® 754 (Huntsman Corp.)
divalent, branched hydrocarbon radicals having up to 15 carbon atoms, for example based on methylcyclohexyl or isophorone structures

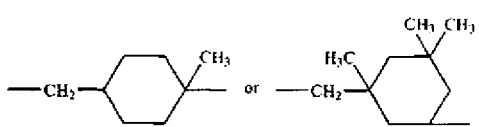

divalent, aromatic hydrocarbon radicals having up to 15 carbon atoms, for example based on 2,4-toluyl, 2,6-toluyl, bis-phenylmethane and naphthylene structures

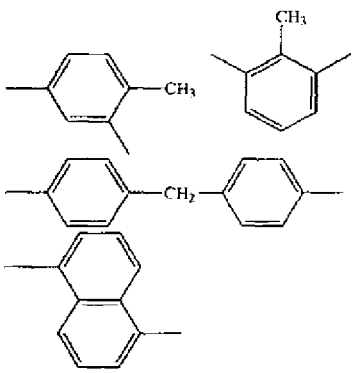

It is furthermore within the context of the invention also to employ primary and secondary amines or alcohols of higher functionality for formation of the hydrocarbon radical $ST^1$. An example is $N(CH_2CH_2NH_2)_3$.

Further examples of polyamines or polyols which can contribute to the radical $ST^1$ include, for example: hexamethylenediamine, phenylenediamine, toluenediamine, cyclohexanediamine, ethylenediamine and oligomers thereof, trimethylolpropane, glycol, glycerol, pentaerythritol, sugars, or polyalkoxylated derivatives of polyamines or polyols.

In another preferred embodiment, the hydrocarbon radicals $ST^1$ are more complex structures which are derived from primary and secondary amino-functionalized or hydroxyfunctionalized prepolymers, which can likewise be of higher functionality.

Examples are:
primary or secondary amino-terminated or hydroxy-terminated polyethers, preferably ethylene oxide- and propylene oxide-based polyethers, for example primary and secondary amino-terminated polyethers of the Jeffamine® type, for example of the ED and T series (Huntsman Corp.),
$NH_2$— or OH-terminated polyamides,
$NH_2$— or OH-terminated polyureas.

The introduction according to the invention of siloxane blocks into $ST^1$ is preferably carried out via α,ω-primary or secondary amino-functionalized polyorganosiloxanes.

The preparation of the corresponding α,ω-primary or secondary aminoalkyl-terminated polyorganosiloxanes is prior art (Silicone, Chemie and Technologie, Vulkan Verlag Essen 1989, p. 85-90).

It is furthermore within the context of the invention to employ polyorganosiloxanes of higher functionality carrying primary or secondary amino groups for formation of the hydrocarbon radical $ST^1$. These comb-like and optionally α,ω-amino-functionalized siloxanes are likewise known from the prior art.

The polycarbonate- and/or polyurethane-polyorganosiloxane compounds according to the invention are preferably prepared by a process which includes the reaction of a compound of the formula (12)

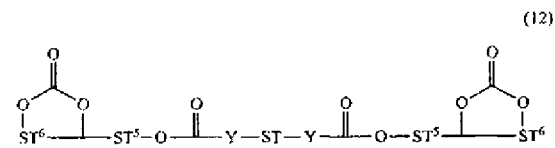

(12)

wherein $ST=ST^1$ or $ST^2$, which are as defined above, and $Y=Y^1$ or $Y^2$, which are as defined above, and $ST^5$ and $ST^6$ are as defined above, with a compound of the formula

HY-ST-YH wherein $ST=ST^1$ or $ST^2$ and Y is as defined above, with the proviso that at least one of the radicals $ST^1$ and/or $ST^2$ comprises a polyorganosiloxane radical.

In a preferred variant of the process, $Y=NR^2$, wherein $R^2$ is as defined above, preferably hydrogen, and $ST^5$ and $ST^6$ are each —$CH_2$—.

The polycarbonate- and/or polyurethane-polyorganosiloxane compounds according to the invention can furthermore be prepared by a process which includes the reaction of a compound of the formula (13)

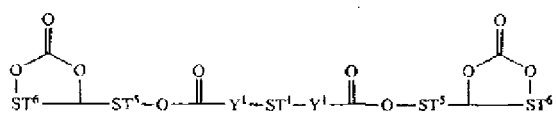

wherein $ST^5$, $ST^6$, $Y^1$ and $ST^1$ are as defined above, with a compound of the formula

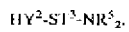

wherein $ST^3$, $Y^2$ and $R^5$ are as defined above,
(Preferably, in the process variant described above, $ST^5$ and $ST^6$ are each —$CH_2$—, $Y^1$ and $Y^2$ are independently of each other —$NR^2$—, wherein $R^2$ is as defined above, preferably hydrogen),
and a compound of the formula

(In this further embodiment, the polycarbonate- and/or polyurethane-polyorganosiloxane compounds contain at least one radical $ST^2$ with quaternary groups, of the formula (10):

-$ST^3$-$N^+(R^5)_2$-$ST^4$-$N^+(R^5)_2$-$ST^3$-    (10)

wherein $ST^3$, $ST^4$ and $R^5$ are as defined above),
wherein Q is a radical which is capable of alkylation of an amino group, and $ST^{4V}$, together with the molecular part originating from Q after the quaternization reaction, forms the radical $ST^4$,
with the proviso that at least one of the radicals $ST^1$, $ST^3$ and/or $ST^4$ comprises a polyorganosiloxane radical which is divalent or more than divalent, and $ST^4$=$ST^{4V}$ or a radical $ST^{4V}$ which is optionally modified after the reaction, such as, for example, a haloalkyl radical after the reaction.

The radicals Q which are capable of quaternization or, respectively, alkylation of the amino groups are preferably chosen from epoxy groups and haloalkyl groups. The following example is given to illustrate the radical $ST^{4V}$:

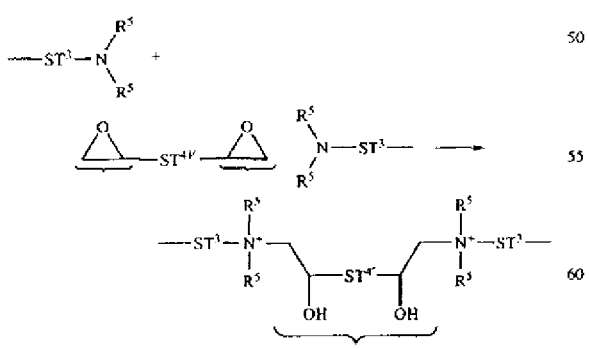

$ST^4$ is thus formed $ST^4$; $T^{4V}$ after reaction of the alkylating group Q, e.g. the molecule parts resulting from the haloalkyl or epoxy groups.

The polycarbonate- and/or polyurethane-polyorganosiloxane compounds which are preferably prepared by this process are thus those which contain at least one radical $ST^2$ of the formula (10):

wherein $ST^3$, $ST^4$ and $R^5$ are as defined above.

For the preparation of the compounds of the formula (12)

(12)

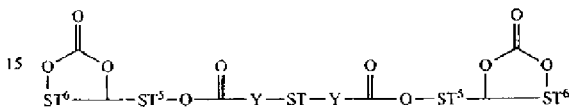

wherein Y, ST, $ST^5$ and $ST^6$ are as defined above,
in one embodiment of the invention, in a first step the amino- or hydroxy-terminated ST starting substance dealt with above HY-ST-YH, wherein Y and ST are as defined above, are reacted with carbonic acid phenyl esters of the structure

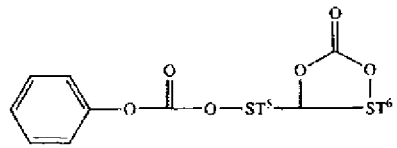

such as, for example,

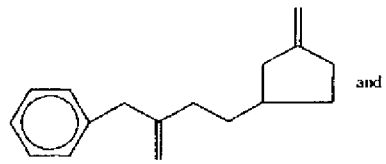

and

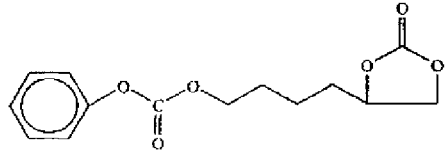

(see e.g. WO 2005/058863).

According to another embodiment of the invention, it is possible to convert, with an excess of $COCl_2$, the amino- or hydroxy-terminated starting substance contributing the ST radical into the corresponding chloroformic acid derivatives, which then react with

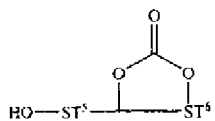

preferably

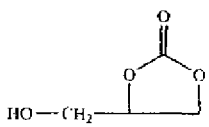

to give the carbonate-terminated intermediate products.

According to a further embodiment of the invention, it is possible first to convert the carbonate precursor

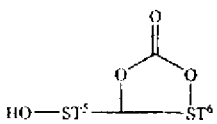

preferably

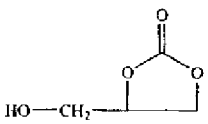

with an excess of $COCl_2$ into chloroformic acid ester derivatives, which finally react with the amino- or hydroxy-terminated starting substances contributing the radical ST, in particular $ST^1$, to give the carbonate-terminated intermediate stages.

The advantage of this reaction concept is the avoidance of phenol as a leaving group.

As a result of these reactions, cyclic carbonate-terminated intermediates containing ST, in particular $ST^1$, are thus formed.

These intermediates can be reacted with suitable partners containing ST, in particular $ST^2$. These reaction partners are substances which have two reactive amino or hydroxyl units. Reactive amino groups are very preferred in this context, since they have a relatively high reactivity towards the cyclic carbonates, whereas the hydroxyl groups have only a low reactivity.

In a preferred embodiment, the structures here are primary-tertiary or secondary-tertiary diamino structures, such as, for example, N,N-dimethylpropylenediamine. A prerequisite of the use of such diamino structures is the simultaneous use of polyfunctional, in particular difunctional quaternizing agents, since otherwise no chain formation is possible. The formation of the $ST^2$ structural element of the formula (10):

$$-ST^3-N^-(R^5)_2-ST^4-N^+(R^5)_2-ST^3- \qquad (10)$$

takes place in this manner.

The use of e.g. N-methylpiperazine includes the possibility that cyclic ST, in particular $ST^2$ structures can form.

The use of primary-secondary diamines is also possible.

After the build up of the chain, amino groups which remain can optionally be alkylated.

Examples of amino structures of higher functionality for producing branched compounds are:

N,N,N′,N′-tetramethyldipropylenetriamine (Jeffcat ZR50B Huntsman)

N,N,N′,N′-tetramethyldiethylenetriamine

The reactions of

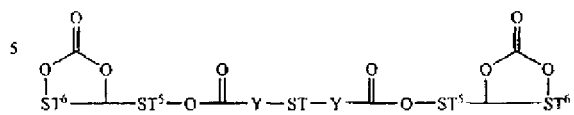

with the amino-functional or hydroxy-functional $ST^2$ precursors are preferably carried out in the range of from room temperature to 160° C., preferably to 140° C. The reaction times are a few minutes to some hours. In this context, the amino-functional precursors which form the $ST^2$ unit are in general more reactive than the hydroxy-functional $ST^2$ precursors.

The reaction times, the reaction temperatures and the conversion achieved depend in particular on the type of amino groups on the precursors forming the $ST^2$ unit. Generally, primary amino groups react more readily than secondary amino groups.

The quaternization compound is needed in the preparation of the polycarbonate- and/or polyurethane-polyorganosiloxane compounds containing $ST^3$ and $ST^4$ in order to render possible a polymerization with chain formation. In a preferred embodiment, the partners containing $ST^4$ are hydrocarbon-based α,ω-epoxy- and/or halogen-functionalized substances.

The hydrocarbon-based epoxide derivatives are preferably hydrocarbon diepoxides, for example vinylcyclohexene diepoxide,
epichlorohydrin,
epoxy-terminated polyethers, preferably ethylene oxide- and propylene oxide-based polyethers, for example glycidyl-terminated polyethers,
epoxy-terminated polyesters,
epoxy-teiniinated polycarbonates.

The halogen-functionalized hydrocarbon derivatives, preferably chlorides and bromides, are preferably
hydrocarbon dihalides
halogen-terminated polyethers, preferably ethylene oxide- and propylene oxide-based polyethers
halocarboxylic acid esters of hydrocarbon diols and polyethers, preferably ethylene oxide- and propylene oxide-based polyethers, specifically chloroacetic acid esters, chloropropionic acid esters and chlorobutanoic acid esters of hydrocarbon diols and polyethers.

It is likewise within the context of the invention to convert difunctional acid alkoxylates into corresponding glycidyl, halogen or halocarboxylic acid ester derivatives and to employ them according to the invention. These are derived, for example, from succinic acid.

The synthesis of the particularly preferred chlorocarbonic acid esters is carried out in a known manner (Organikum, Organisch-Chemisches Grundpraktikum, 17th edition, VEB Deutscher Verlag der Wissenschaften, Berlin 1988, p. 402-408) by reaction of the diol component with the corresponding halocarboxylic acid anhydrides or halocarboxylic acid chlorides.

In a further embodiment, the hydrocarbon radicals $ST^4$ are more complex α,ω-epoxy- or halogen-terminated structures which are derived from α,ω-hydroxy-functionalized prepolymers. These α,ω-hydroxy-functionalized prepolymers are preferably the reaction products of
diols with diisocyanates
OH-tetininated polyethers, preferably ethylene oxide- and ropylene oxide-based polyethers with diisocyanates
OH-terminated polyesters,
OH-terminated polycarbonates In a preferred embodiment, these α,ω-hydroxy-functionalized prepolymers are converted into the corresponding α,ω- halocarboxylic acid esters, specifically chloroacetic acid esters, chloropropionic acid esters and chlorobutanoic acid esters.

The introduction according to the invention of siloxane blocks into $ST^4$ is preferably carried out via α,ω-epoxy-terminated siloxanes, preferably α,ω-glycidyl- and epoxycyclohexyl-terminated siloxanes α,ω-haloalkyl-telininated siloxanes, preferably chloropropyl- and chloropropenyl-terminated siloxanes α,ω-halocarboxylic acid ester-terminated siloxanes, preferably esters of chloroacetic acid, chloropropionic acid and chlorobutanoic acid α,ω-halocarboxylic acid ester-terminated polyether-siloxanes, preferably esters of chloroacetic acid, chloropropionic acid and chlorobutanoic acid.

The preparation of the α,ω-epoxy-terminated siloxanes and α,ω-haloalkyl-terminated siloxanes entering into $ST^4$ is described in the prior art (Silicone, Chemie and Technologie, Vulkan Verlag Essen 1989, p. 85-90 and 120).

The preparation of α,ω-halocarboxylic acid ester-terminated siloxanes can be carried out analogously to the procedure according to WO 02/10256, Example 1. In this, SiH-siloxanes are reacted with halocarboxylic acid esters of olefinically or acetylenically unsaturated alcohols.

The preparation of α,ω-halocarboxylic acid ester-terminated polyether-siloxanes can be carried out analogously to WO 02/10257, Example 1. In this, SiH-siloxanes are reacted with halocarboxylic acid esters of olefinically or acetylenically unsaturated polyethers. Alternatively, it is possible to react polyether-siloxanes with halocarboxylic acids or anhydrides or acid chlorides thereof (U.S. Pat. No. 5,153,294, U.S. Pat. No. 5,166,297).

In a particularly preferred case, the siloxane unit in the ST units has the structure

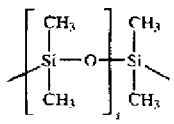

where s is as stated above.

In a further embodiment, the introduction of siloxane blocks into the ST structures is carried out via α,ω-epoxy- or halogen-functionalized siloxane prepolymers, which can preferably be obtained from the corresponding α,ω-hydroxyalkyl or α,ω-hydroxypolyether-terminated siloxane prepolymers.

These OH-terminated siloxane-containing prepolymers are preferably prepared by reaction of α,ω-hydroxyalkyl-terminated siloxanes with diisocyanates, α,ω-polyether-terminated siloxanes with diisocyanates and are then converted into the epoxy and halogen derivatives. The α,ω-halocarboxylic acid-functionalized siloxane prepolymers which are accessible by esterification with e.g. the anhydrides and acid chlorides represent a preferred embodiment.

It is furthermore within the context of the invention to employ hydrocarbon-based or siloxane-based substances of higher functionality for formation of the radical ST2. These materials contain more than two of the epoxy or halogen functions dealt with above.

Examples of hydrocarbon-based substances of higher functionality are the glycidyl or chloroacetic acid ester derivatives of glycerol, pentaerythritol, sorbitol, and ethoxylates and/or propoxylates thereof. It is likewise within the context of the invention to convert acid alkoxylates of higher functionality into corresponding glycidyl or chloroacetic acid ester derivatives and to employ them according to the invention. These are derived, for example, from trimellitic acid or pyromellitic acid.

Suitable siloxane-based substances of higher functionality with α,ω- and/or comb-like epoxy or halogen, preferably halocarboxylic acid ester, substitution can be obtained, for example, from hydroxy-functional precursors, which are accessible by addition of allyl alcohol, butynediol and the alkoxylates of allyl alcohol or butynediol on to corresponding SiH-siloxanes. Alternatively, for example, unsaturated epoxy- or halocarboxylic acid ester-functional precursors can be added on to corresponding SiH-siloxanes.

It is an essential feature that the functionality of these hydrocarbon-based or siloxane-based substances of higher functionality is greater than two.

It is furthermore within the context of the invention to employ monofunctional hydrocarbon-based or siloxane-based substances for formation of terminal radicals ST. These materials preferably contain one of the epoxy or halogen functions dealt with above.

Examples of monofunctional hydrocarbon-based substances are the glycidyl or chloroacetic acid ester derivatives of alkanols, for example ethanol, 2-propanol, dodecanol and octadecanol, alkenols, for example allyl alcohol, hexenol and oleyl alcohol, and alkynols, for example propynol, and the alkoxylates, specifically ethoxylates and/or propoxylates, of the monofunctional alcohols mentioned. It is likewise within the context of the invention to convert fatty acid alkoxylates into corresponding glycidyl or chloroacetic acid ester derivatives and to employ them according to the invention.

Suitable monofunctional siloxane-based substances with epoxy or halogen, preferably halocarboxylic acid ester, substitution are known e.g. from WO 02/10256. They can be obtained, for example, from unsaturated epoxy- or halocarboxylic acid ester-functional precursors which can be added on to corresponding SiH-siloxanes.

Depending on their nature, these monofunctional hydrocarbon-based or siloxane-based $ST^2$ precursors are added in order to regulate the molecular weight of the polymers formed and, where appropriate in cooperation with the $ST^2$ precursors of higher functionality, to control the degree of branching of the polymer chains.

If epoxy-containing substances are used for introduction of $ST^2$, acid is added in stoichiometric amounts in a manner known from the prior art. The acid anions are inorganic anions, such as halide, specifically chloride, and organic anions, such as carboxylate, specifically $C_2$ to $C_{18}$-carboxylate, alkyl polyether-carboxylate, alkyl sulfate, specifically methosulfate, sulfonate, specifically alkylsulfonate and alkylarylsulfonate, very specifically toluylsulfonate.

It is within the context of the invention to carry out the entire reaction sequence or individual part steps without a solvent or in the presence of solvents. Preferred solvents are typical lacquer solvents, such as methoxypropyl acetate, butyl acetate and toluene.

As a result of the total reaction sequence described, using the quaternizing reagents quaternized polycarbonate- and/or polyurethane-polyorganosiloxane compounds which have polyorganosiloxane units at least in one of the structural elements ST, including $ST^1$ to $ST^4$, are obtained.

The invention furthermore relates to the use of the polycarbonate- and/or polyurethane-polyorganosiloxane compounds according to the invention for the preparation of coatings, agents for modification of surfaces, elastomers, thermosets, adhesives, primers for metal and plastics surfaces, polymer additives, detergent additives, rheological agents, cosmetics and agents for modification of fibres.

In cosmetic formulations for hair, in this context the polycarbonate- and/or polyurethane-polyorganosiloxane compounds according to the invention can exert in particular the function of so-called conditioning agents ("conditioner"), i.e. in particular favourably influence the properties of hair, such as softness, shine, fullness, combability etc., it also being possible for them to be used, in particular, in combination with other conventional conditioning agents, such as e.g. poly-alpha-olefins, fluorinated oils, fluorinated waxes, fluorinated rubbers, carboxylic acid esters having at least 10 carbon atoms, cationic polymers, silicones which are insoluble or soluble in the medium of the formulation, mineral oils, plant oils and animal oils and mixtures thereof, as described, for example, in WO 99/009939.

The invention furthermore preferably relates to the use of the polycarbonate- and/or polyurethane-polyorganosiloxane compound according to the invention for the preparation of coatings or agents for modification of surfaces on hard surfaces, such as, for example, glass, ceramic, tiles, concrete and steel parts, such as automobile bodies and ship hulls.

The invention furthermore preferably relates to the use of the polycarbonate- and/or polyurethane-polyorganosiloxane compounds according to the invention for the preparation of primers for bonding silicone elastomers with other substrates, such as steel, aluminium, glass and plastics, such as epoxy resins, polyamides, polyphenylene sulfides and polyesters, such as polyterephthalates.

In a further preferred embodiment of the invention, this relates to the use of the polycarbonate- and/or polyurethane-polyorganosiloxane compounds according to the invention for the preparation of modifying agents for thermoplastics, such as polyolefines, polyamides, polyurethanes, poly(meth)acrylates and polycarbonates.

In a further preferred embodiment of the invention, this relates to the use of the polycarbonate- and/or polyurethane-polyorganosiloxane compounds according to the invention for the preparation of low temperature impact modifiers.

In this context, the expression "for the preparation of" as used above also includes the case where the polycarbonate- and/or polyurethane-polyorganosiloxane compounds according to the invention are used by themselves for the use mentioned. That is to say, for example, the polycarbonate- and/or polyurethane-polyorganosiloxane compounds according to the invention can be used themselves directly as low temperature impact modifiers. However, they can also be provided suitably beforehand, for example by mixing, compounding or preparation of masterbatches.

The polycarbonate- and/or polyurethane-polyorganosiloxane compounds can furthermore preferably be used as a constituent in adhesives and sealants, as a base material for thermoplastic elastomers, such as, for example, cable sheathings, hoses, seals and keyboard mats, and for membranes, such as selectively gas-permeable membranes. A further use of the copolymers according to the invention comprises coatings, such as antifouling and non-stick coatings, fabric-compatible coatings, flame-retardant coatings and biocompatible materials.

These can serve as coating compositions for cosmetics, body care compositions, lacquer additives, an auxiliary substance in detergents, defoamer formulations and textile processing, for modification of resins or for modification of bitumen.

Further uses include packaging material for electronic components, insulation or shielding materials, sealing material in hollow spaces where condensation water forms, such as aircraft, airframes, ships and automobiles, antifogging coatings for floodlight screens (inside), panes for residential buildings, vehicles or medical equipment and additives for polishing, cleaning or care compositions, as an additive for body care compositions, as a coating material for wood, paper and cardboard, as a mould release agent, as a biocompatible material in medical uses, such as contact lenses, as a coating material for textile fibres or textile fabric, as a coating material for natural substances, such as e.g. leather and furs, as a material for membranes and as a material for photoactive systems, e.g. for lithographic processes, optical data protection or optical data transmission.

In a further preferred embodiment of the invention, this relates to the use of the polycarbonate- and/or polyurethane-polyorganosiloxane compounds according to the invention for the preparation of viscosity regulators, antistatic agents, of mixing components for silicone rubbers which can be crosslinked to elastomers peroxidically or by hydrosilylation (platinum catalysis), and there lead to modification of surface properties, to modification of the diffusion of gases, liquids etc., or modify the swelling properties of the silicone elastomers, of softeners for textile fibres for treatment of the textile fibres before, during and after washing, of agents for modification of natural and synthetic fibres, such as, for example, hair, cotton fibres and synthetic fibres, such as polyester fibres and polyamide fibres and blended fabrics, of textile finishing agents, and of detergent-containing formulations, such as detergents and cleaning compositions.

The present invention furthermore relates to novel detergent formulations, cosmetic formulations and fibre treatment formulations which contain the polycarbonate- and/or polyurethane-polyorganosiloxane compounds according to the invention.

The polycarbonate- and/or polyurethane-polyorganosiloxane compounds according to the invention can thus be present, for example, in solid or liquid detergent formulations in contents of from about 0.1 to 10% by wt., based on the total amount of the formulation, and present in cosmetic formulations and formulations for fibre treatment, such as textile care compositions before, during and after washing, in contents of from about 0.1 to 50% by wt., based on the total amount of the formulation.

Preferably, the polycarbonate- and/or polyurethane-polyorganosiloxane compounds according to the invention can be employed for treatment and finishing of hard surfaces, such as glass, ceramic, tiles, plastics surfaces, metal surfaces and lacquer surfaces, specifically ship hulls and automobile bodies, quite specifically also in dryer formulations for mechanical washing of automobiles, as adhesives or primers, preferably for bonding silicone elastomers with other substrates, such as steel, aluminium, glass, epoxy resin or polyamide, as modifiers, e.g. low temperature impact modifiers and polarity modifiers, for hydrocarbon-based polymers and silicone-based elastomer systems based on peroxidic and Pt-catalysed crosslinking.

They can furthermore be used for treatment of natural and synthetic fibres, for example cotton, wool and polyester- and polyamide-based synthetic fibres, specifically in the form of textiles, in special compositions for fibre treatment, in particular in detergent formulations containing anionic, nonionic and cationic surfactants, wherein the compounds according to the invention can be incorporated into the detergent directly or metered in separately as the washing process runs or after the washing process, and softness, improved elasticity and reduced tendency to crease are imparted to the substrates treated, while retaining an acceptable hydrophilicity.

They can likewise serve as a constituent of separate softener systems, specifically based on cationic surfactants, after washing of fibres and textiles, as an ironing aid and an agent for preventing or reversing creases in textiles.

They can furthermore be used for finishing fibres, specifically for the first finishing and treatment of, for example, cotton, wool and polyester- and polyamide-based synthetic fibres, specifically in the form of textiles, paper and wood.

As described above, they can furthermore advantageously be employed in cosmetic systems for treatment of hair and skin.

Particularly preferred fields of use for the polycarbonate- and/or polyurethane-polyorganosiloxane compounds according to the invention are also, preferably aqueous, solutions, mixtures, emulsions and microemulsions, in particular as a base for cosmetic formulations.

The polycarbonate- and/or polyurethane-polyorganosiloxane compounds according to the invention can be used as a pure substance, solution, mixture, emulsion or microemulsion in the form of liquids, creams or pastes, as a starting substance for the preparation of suitable cosmetic formulations according to the invention of various viscosities.

The process for the preparation of formulations of the polycarbonate- and/or polyurethane-polyorganosiloxane compounds according to the invention, such as, for example, for treatment of substrates, such as hard or flexible substrates, can comprise, for example, the following steps:

a) preparation of a premix in the form of solutions, mixtures or emulsions with the polycarbonate- and/or polyurethane-polyorganosiloxane compounds according to the invention and b) preparation of a further mixture using the premix a) and addition optionally of further surfactants, auxiliary substances and other additives, or c) combination of steps a) and b), in which the mixing of the constituents is carried out with stirrers, dissolvers, kneaders, pumps, mixing screws, mixing nozzles and low and high pressure emulsifying apparatuses.

The processes are realized with the machines and apparatuses known in the art (Ullmann's Enzyklopädie), such as e.g. any form of stirrers in suitable containers, apparatuses or mixing apparatuses, as described above.

Direct mixing of all the constituents is possible. However, the preparation of a premix is preferred, since it leads to faster and better distribution and is partly unavoidable, since the various substance groups otherwise cannot be mixed or emulsified or dispersed with one another in a suitable manner, or can be only with a high outlay. Suitable premixes or intermediate mixtures can preferably be mixtures in the form of solutions, pastes, creams or other forms of emulsions or dispersions. The preparation and use of microemulsions of 10 to 200 nm average particle diameter in cosmetic formulations is particularly preferred.

The formulations which contain the polycarbonate- and/or polyurethane-polyorganosiloxane compounds according to the invention can be prepared, for example, in various presentation forms, such as for hair treatment. Preferably, the compositions containing the polycarbonate- and/or polyurethane-polyorganosiloxane compounds according to the invention are used as cosmetic formulations for treatment of keratin-containing substrates, such as e.g. human and animal hair or skin, as an alcoholic or polyalcoholic solution or as an emulsion. Depending on the raw materials and auxiliary substances used and the mixing process during the preparation, clear, cloudy and white formulations are obtained.

Alcoholic and polyalcoholic solvents and mixtures thereof with water, oil-like substances and conventional silicones (inter alia polydimethylsiloxanes) and binary and ternary mixtures of solvents and/or oil-like substances and/or silicones are preferably suitable for the preparation of solutions and mixtures which contain the polycarbonate- and/or polyurethane-polyorganosiloxane compounds according to the invention. Particularly preferred solvents here are ethanol, isopropanol, ethylene glycol and ethylene glycol ethers, polyethylene glycols and ethers thereof, propylene glycol and propylene glycol ethers, polypropylene glycols and ethers thereof and glycerol and mixtures thereof. Particularly preferred oil-like substances are mineral oil products and oils of plant, animal and synthetic origin and mixtures thereof. Particularly preferred silicones, which differ from the polycarbonate- and/or polyurethane-polyorganosiloxane compounds according to the invention, include cyclic and linear polydimethylsiloxanes and mixtures thereof, such as e.g. (according to INCI) cyclomethicone, cyclotetrasiloxane, cyclopentasiloxane, cyclohexasiloxane, dimethicone with a viscosity range of from 0.65 to 60,000,000 mPa·s at 25° C. and dimethiconol with a viscosity range of from 10 to 60,000,000 mPas. at 25° C.

Preferred solutions and mixtures which contain the polycarbonate- and/or polyurethane-polyorganosiloxane compounds according to the invention have the following composition in % by wt., based on the total weight of the composition:

Solutions or mixtures:

| | |
|---|---|
| 0.1-99.9% | polycarbonate- and/or polyurethane-polyorganosiloxane compounds according to the invention |
| 0.1-99.9% | solvent and/or oil and/or silicones and/or water |

Compositions of emulsions of the polycarbonate- and/or polyurethane-polyorganosiloxane compounds according to the invention:

For preparation of the emulsions, water and nonionic, cationic and amphoteric surfactants and surfactant mixture are generally used. Emulsions can moreover contain auxiliary substances, such as e.g. inorganic and organic acids, bases and buffers, salts, thickeners, stabilizers for emulsions, such as e.g. "xanthan gum", preservatives, foam stabilizers, defoamers and solvents, such as e.g. alcohols (ethanol, isopropanol, ethylene glycol, polyethylene glycol, propylene glycol, polypropylene glycol, glycol ethers and glycerol and mixtures thereof).

The polycarbonate- and/or polyurethane-polyorganosiloxane compounds according to the invention which are used in the emulsions can also themselves serve as an emulsifier in the preparation of emulsions.

A preferred emulsion which can preferably be used for the preparation of cosmetic formulations comprises, for example, the following constituents in % by wt., based on the total amount of the composition:

| | |
|---|---|
| 10-50% | polycarbonate- and/or polyurethane-polyorganosiloxane compounds according to the invention, |
| 1-35% | surfactants, |
| 0-10% | auxiliary substances, |
| 0-20% | solvent, |
| to 100% | topped up by water. |

Microemulsions for cosmetic formulations, finishing of textiles and other fibrous substrates or coating of hard surfaces:

The preparation of microemulsions with a high active content of polycarbonate- and/or polyurethane-polyorganosiloxane compounds according to the invention is particularly preferred, since in addition to the possibility of the preparation of clear cosmetic formulations, these additionally offer the advantage of incorporation into aqueous formulations by simple process technology ("cold process"). There is the possibility of employing the polycarbonate- and/or polyurethane-polyorganosiloxane compounds according to the invention in the preparation of microemulsions in the form of the solutions and mixtures described above. A preferred active content of the polycarbonate- and/or polyurethane-polyorganosiloxane compounds according to the invention in the emulsion is between 5 and 60% by wt., and 10-50% by wt. is particularly preferred, based on the total amount of the composition.

A quite specifically preferred microemulsion comprises the following constituents, which do not, however, limit the invention, in % by wt., based on the total amount of the microemulsion:

| | |
|---|---|
| 20-80% | polycarbonate- and/or polyurethane-polyorganosiloxane compounds according to the invention |
| 0-35% | surfactants |

| | |
|---|---|
| 0-10% | auxiliary substances |
| 0-20% | solvent |
| to 100% | topped up by water. |

The invention also provides the use of the solutions, mixtures or emulsions prepared with the polycarbonate- and/or polyurethane-polyorganosiloxane compounds according to the invention in a cosmetic formulation.

These cosmetic formulations are prepared using the previously prepared solutions or emulsions, but they can also be produced directly from the individual constituents.

Cosmetic Formulations:

Cosmetic formulations include, for example:

So-called "rinse-off" products, such as e.g. "2-in-1" shampoos, "body wash" and hair rinses for treatment of hair during and after cleansing or after colouring or treatment of hair before bleaching, curling or straightening, and so-called "leave-in" products, such as hair treatments, care creams, hairdressing creams, hair gels, hair styling products, hair setting compositions, hair sprays, pump sprays, blow-waving compositions and blow-drying setting compositions. The formulations moreover likewise include hair colouring compositions, which can be differentiated into 3 types according to the resistance of the colour result to washing—permanent, semipermanent and temporary hair colouring compositions. The term hair here includes all keratin-containing fibres, but in particular human hair. The hair colouring compositions contain, for example, conventional silicones, surfactants, auxiliary substances and colouring agents, in addition to the polycarbonate- and/or polyurethane-polyorganosiloxane compounds according to the invention. Each of these ingredients can be used either by itself or in combination with further ingredients, and represents additional functions in the formulations which serve to increase the volume, the combability and the shine and to reduce washing out of the colour of and from coloured keratin-containing substrates, such as e.g. human and animal hair, and contain at least one polycarbonate- and/or polyurethane-polyorganosiloxane compound.

The abbreviations mentioned in connection with the cosmetic formulations are explained in the INCI (The Cosmetic, Toiletry and Fragrance Association Washington D.C.).

The silicones included here in addition to the polycarbonate- and/or polyurethane-polyorganosiloxane compounds according to the invention include, for example:

Cyclic, linear and branched polydimethylsiloxanes having a viscosity of 0.65-200,000,000 mPa·s at 25° C. and mixtures thereof, such as e.g. octaorganocyclotetrasiloxanes, octamethylcyclotetrasiloxanes, decaorganocyclopentasiloxanes and dodecaorganocyclohexasiloxanes, wherein the organic radical preferably denotes methyl, such as SF 1173, SF 1202, SF 1217, SF 1204 and SF 1258 from Momentive Performance Materials, formerly GE Bayer Silicones, dimethicones, such as the Baysilone M oils (M3 to M 2,000,000), SE 30, SF 1214, SF 1236, SF 1276 and CF 1251 from GE Bayer Silicones/ Momentive Performance Materials, and dimethiconols, such as Baysilone, SiOH-terminated "gums" from GE Bayer Silicones/Momentive Performance Materials and DC 1501 and DC 1503 from Dow Corning.

The use of the polydimethylsiloxanes described above in the form of nonionic, anionic and cationic emulsions, such as e.g. SM 2169, SM 2785, SM 555, SM 2167 and SM 2112 from GE Bayer Silicones/Momentive Performance Materials in combination with emulsions of the polycarbonate- and/or polyurethane-polyorganosiloxane compounds according to the invention and/or the use of mixtures and solutions of the polydimethylsiloxanes described above with the polycarbonate- and/or polyurethane-polyorganosiloxane compounds according to the invention is particularly preferred here, since particular properties of hair care products can be derived from these combinations, such as has already been described extensively in the literature for amino-functional silicones known to date (WO 99/44565, WO 99/44567, WO 99/49836, WO 99/53889, WO 97/12594, U.S. Pat. No. 6,028,031, EP 0811371, WO 98/18443, WO 98/43599 and US 2002-0182161).

Solid silicones, so-called MQ resins, such as e.g. SR 1000 from GE Bayer Silicones/Momentive Performance Materials, and solutions thereof in solvents, such as the abovementioned silicones and aliphatic solvents, such as e.g. isododecane, are likewise suitable.

Organofunctional silicones, such as alkyl-, aryl-, arylalkyl-, phenyl-, fluoroalkyl-, and polyether-modified silicones, such as the types SF 1632, SF 1642, SF 1555, Baysilone CF 1301, Baysilone PK 20, FF 157, SF 1188A, SF 1288 and SF 1388 from GE Bayer Silicones/Momentive Performance Materials are likewise suitable.

Surfactants:

Surfactants as ingredients of cosmetic formulations are described in A. Domsch: Die kosmetischen Präparate, Verlag für Chem. Industrie, 4th edition, 1992, in Kosmetikjahrbuch 1995, Verlag für chemische Industrie, 1995, and H. Stache, Tensidtaschenbuch, 2nd edition, Carl Hanser Verlag, 1981.

Anionic Surfactants:

By way of example but without being limited thereto, the following anionic surfactants are suitable as a constituent of the formulations:

Alkyl sulfates, alkyl ether-sulfates, alkaryl sulfates, olefinsulfonates, alkylamide ether-sulfates, acyl isethionates, acyl glutamates, alkyl ether-carboxylates, methyl taurides and taurides, sarcosides, sulfosuccinates, protein-fatty acid condensates, alkyl phosphates and alkyl ether-phosphates. The free acids and alkali metal salts and magnesium, ammonium and mono-, di- and triethanolamine salts thereof can be used here.

The alkyl and acyl groups typically contain 8-18 C atoms and can be unsaturated. The alkyl ether-sulfates, alkylamide ether-sulfates, alkyl ether-carboxylates and alkyl ether-phosphates can contain 1-10 ethylene oxide or propylene oxide units or a combination of ethylene oxide and propylene oxide units.

Amphoteric Surfactants:

By way of example but without being limited thereto, the following amphoteric surfactants are suitable as a constituent of the formulations:

Alkylbetaines, alkylamidobetaines, sulfobetaines, acetates and diacetates, imidazolines, propionates and alkylamine oxides.

The alkyl and acyl groups here contain 8-19 C atoms.

Nonionic Surfactants:

By way of example but without being limited thereto, the following nonionic surfactants are suitable as a constituent of the formulations:

Alkyl ethoxylates, aryl ethoxylates, ethoxylated esters, polyglycolamides, polysorbates, glycerol fatty acid ethoxylates, alkylphenol polyglycol ethers and sugar surfactants, such as e.g. alkyl glycosides.

Cationic Surfactants:

In the case of cationic surfactants, a distinction is made between pure cationic surfactants and cationic polymers.

Pure Cationic Surfactants:

By way of example but without being limited thereto, the following nonionic surfactants are suitable as a constituent of the formulations:

Monoalkylquats, dialkylquats, trialkylquats, tetraalkylquats, benzylammonium salts, pyridine salts, alkanolammonium salts, imidazoline salts, oxazoline salts, thiazoline salts, salts of amine oxides and sulfone salts, wherein the term "quat" implies the presence at least of one quaternary ammonium group.

Cationic Polymers:

For "2-in-1" shampoos in particular, cationically modified polymers are also employed, in addition to the pure cationic surfactants. A comprehensive description of these polymers is given in U.S. Pat. No. 5,977,038 and WO 01-41720 A1. Cationic polyacrylamides, cationic protein derivatives, hydroxyalkylcellulose ethers and cationic guar derivatives are preferred here. Cationic guar derivatives with the CTFA name Guar Hydroxypropyltrimonium Chloride are particularly preferred. These types are obtainable under the trade names Cosmedia Guar C 261 (Henkel), Diagum P 5070 (Diamalt) and Jaguar C types and Jaguar EXCEL from Rhodia.

Auxiliary Substances:

Auxiliary substances as ingredients in particular of cosmetic formulations are described in: A. Domsch, Die kosmetischen Präparate, Verlag für Chem. Industrie, 4th edition, 1992; and in: Kosmetikjahrbuch 1995, Verlag für Chemische Industrie, 1995.

By way of example but without being limited thereto, the following auxiliary substances are suitable as a constituent of the formulations:

Inorganic and organic acids, bases and buffers, salts, alcohols, such as e.g. ethanol, isopropanol, ethylene glycol, polyethylene glycol, propylene glycol, polypropylene glycol, glycol ethers and glycerol, thickeners, stabilizers for emulsions, such as e.g. xanthan gum, re-oiling agents, preservatives, foam stabilizers, defoamers, pearlescent and opacifying agents, such as e.g. glycol distearates and titanium dioxide, collagen hydrolysate, keratin hydrolysate, silk hydrolysate, antidandruff active compounds, such as e.g. zinc pyrithione, salicylic acid, selenium disulfide, sulfur and tar preparations, polymeric emulsifiers, vitamins, dyestuffs, UV filters, bentonites, perfume oils, fragrances, styling polymers, moisturizers, plant extracts and further natural or nature-identical raw materials.

It is known that by the addition of oil- and water-soluble UV filters or combinations of UV filters in cosmetic formulations for care and treatment of keratin-containing substrates, such as human and animal hair, the degradation of dyestuffs and therefore the bleaching out and fading of coloured keratin-containing substrates by UV radiation can be reduced decisively or even prevented completely.

Ingredients for Hair Colouring Compositions:

Dyestuffs and other ingredients of hair colouring compositions are described in: A. Domsch, Die kosmetischen Präparate, Verlag für Chem. Industrie, 4th edition, 1992. Dyestuffs are described in: Legislation on cosmetic agents (Cosmetics Legislation), Bundesgesetzblatt 1997, part I p. 2412, §3 and annex 3 and in European Community (EC) Directive, 76/68/EEC, annex IV.

In the following, hair colouring compositions are differentiated into permanent, semipermanent and temporary hair colour compositions.

Permanent Hair Colouring Compositions:

Permanent dyeings which are not washed out even by washing the hair several times (more than 10) are formed by chemical reaction between dyestuff precursors under oxidative conditions by hydrogen peroxide. The mixture of the corresponding components determines the colour result which can be achieved here. In the case of the precursors, a distinction is made between oxidation bases (developers) and coupling components (modifiers).

Oxidation Bases:

By way of example but without being limited thereto, the following oxidation bases are suitable as a constituent of the formulations:

m- and p-phenylenediamines (diaminobenzenes), N-substituted derivatives and salts thereof, N-substituted derivatives of o-phenylenediamine, o-, m- and p-toluylenediamines (methyl-diaminobenzenes), N-substituted derivatives and salts thereof, p-amino-diphenylamine and its hydrochloride and sulfate, o-, m- and p-aminophenol and its hydrochloride, 2,4-diaminoisosulfate (4-methoxy-m-phenylenediamine sulfate), o-chloro-p-phenylenediamine sulfate, picramic acid (2,4-dinitro-6-aminophenol) and 2,4-dinitro-1-naphtholsulfonic acid and the sodium salt thereof.

Coupling Components:

By way of example but without being limited thereto, the following coupling components are suitable as a constituent of the formulations:

Hydroquinone (1,4-dihydroxybenzene), resorcinol (1,3-dihydroxybenzene), pyrocatechol (1,2-dihydroxybenzene), α-naphthol (1-hydroxynaphthalene), pyrogallol (1,2,3-trihydroxybenzene) and 2,6-diaminopyridine.

Oxidation bases and coupling components are conventionally incorporated with surfactants into oil-in-water emulsions, but simple solutions or shampoos are also known as formulations. The formulations moreover contain antioxidants, such as e.g. sodium sulfite, sodium dithionite, ascorbic acid or thioglycollic acid, to stabilize the precursors and are adjusted to a pH of between 8 and 12 (preferably 9-11) with alkaline substances, such as e.g. ammonia. Surfactants as wetting agents, complexing agents for heavy metals, fragrances for masking the ammonia smell, conditioners for improving the feel of the hair and for protecting the hair and solvents, such as ethanol, ethylene glycol, glycerol or benzyl alcohol, are moreover added.

Permanent hair colouring compositions are typically on offer as 2-component systems comprising the colour solution, cream or shampoo described above and the developer solution. The developer solution here contains between 6-12% of hydrogen peroxide, and constituents of the formulation containing the colour components can optionally also be added. The peroxide solution here, however, must be thoroughly stabilized.

Semipermanent Hair Colouring Compositions:

Semipermanent colourings were developed to maintain the colouring for 6-10 washes with shampoo. So-called directly-absorbing dyestuffs which essentially belong to the group of nitro, azo and anthraquinone dyestuffs are used here. These dyestuffs are small enough to penetrate into the hair. Formulations which are typically employed are solutions, creams, shampoos or also aerosol foams. The composition is comparable to the formulations containing the colour component which are used as permanent hair colourings.

Temporary Hair Colouring Compositions:

In contrast to the semipermanent hair colouring compositions, temporary colourings, also called tints, contain larger dyestuff molecules which are not capable of penetrating into the hair. They were developed to maintain the colouring for 1-6 washes. Azo and basic dyestuffs and azine and thiazine derivatives are typically employed here. That stated for the semipermanent and permanent hair colouring compositions applies to the composition of the formulations. Dyestuffs and other ingredients of hair colouring compositions are described in: A. Domsch, Die kosmetischen Präparate, Verlag für Chem. Industrie, 4th edition, 1992. Dyestuffs are described in: Legislation on cosmetic agents (Cosmetics Legislation), Bundesgesetzblatt 1997, part I p. 2412, §3 and annex 3 and in European Community (EC) Directive, 76/68/EEC, annex IV.

The following recipes, which do not, however, limit the invention, in which each functional active compound can occur as an individual compound or as a mixture of several compounds have been found to be particularly advantageous for the use of mixtures containing the polycarbonate- and/or polyurethane-polyorganosiloxane compounds according to the invention in cosmetic formulations.

A typical shampoo formulation according to the invention, which does not, however, limit the invention, for care and conditioning of hair comprises the following constituents in % by wt., in each case based on the total formulation:

| | |
|---|---|
| 0.01-10% | polycarbonate- and/or polyurethane-polyorganosiloxane compounds according to the invention |
| 2-15% | anionic surfactant |
| 0-10% | amphoteric surfactant |
| 0-15% | nonionic surfactant |
| 0-10% | cationic surfactant |
| 0-10% | silicone conditioning agents (co-adjuvants) |
| 0-10% | auxiliary substances |
| to 100% | topped up by water. |

A specific shampoo formulation, which does not, however, limit the invention, comprises the following constituents in % by wt.:

| | |
|---|---|
| 0.1-12% | polycarbonate- and/or polyurethane-polyorganosiloxane compounds according to the invention |
| 1-35% | sodium or ammonium lauryl or laureth sulfate (20-30%) |
| 1-6% | cocoamidopropylbetaine (25-35%) |
| 0-3% | guar hydroxypropyltrimonium chloride |
| 0-5% | polyquaternium-10 |
| 0-12% | silicone conditioning agents (co-adjuvants) |
| 0.01-1% | disodium EDTA |
| 0.01-1% | phenoxyethynol (and) methylparaben (and) butylparaben (and) ethylparaben (and) propylparaben |
| 0-1% | perfume (fragrance) |
| 0-1% | dyestuffs |
| 0-1% | citric acid |
| 0-2% | sodium chloride |
| to 100% | topped up by water. |

A typical hair rinse according to the invention, which does not, however, limit the invention, for care and conditioning of hair comprises the following constituents in % by wt.:

| | |
|---|---|
| 0.1-15% | polycarbonate- and/or polyurethane polyorganosiloxane compounds according to the invention |
| 0-10% | amphoteric surfactant |
| 0.1-15% | nonionic surfactant |
| 0-10% | cationic surfactant |
| 0-15% | silicone conditioning agents (co-adjuvants) |
| 0-20% | auxiliary substances |
| to 100% | topped up by water. |

A specific composition of a hair rinse, which does not, however, limit the invention, comprises the following constituents in % by wt.:

| | |
|---|---|
| 0.5-15% | polycarbonate- and/or polyurethane-polyorganosiloxane compounds according to the invention (as a 43.5% strength emulsion in water with nonionic emulsifiers) |
| 0-15% | silicone conditioning agents (co-adjuvants) |
| 0-10% | cetrimonium chloride (25-35%) |
| 0-3% | guar hydroxypropyltrimonium chloride |
| 1-10% | cetearyl alcohol |
| 0-10% | glycerol |
| 0.01-1% | phenoxyethynol (and) methylparaben (and) butylparaben (and) ethylparaben (and) propylparaben |
| 0-1% | perfume (fragrance) |
| 0-1% | dyestuffs |
| 0-1% | citric acid |
| to 100% | topped up by water. |

A typical hair care treatment according to the invention, which does not, however, limit the invention, for care and conditioning of hair comprises the following constituents in % by wt.:

| | |
|---|---|
| 0.4-20% | polycarbonate- and/or polyurethane-polyorganosiloxane compounds according to the invention |
| 0-15% | nonionic surfactant |
| 0-10% | cationic surfactant |
| 0-20% | silicone conditioning agents (co-adjuvants) |
| 0-20% | auxiliary substances |
| to 100% | topped up by water. |

A specific hair care treatment, which does not, however, limit the invention, comprises the following constituents in % by wt.:

| | |
|---|---|
| 1-20% | polycarbonate- and/or polyurethane-polyorganosiloxane compounds according to the invention (as a 43.5% strength emulsion in water with nonionic emulsifiers) |
| 0.5-10% | stearyl alcohol (and) steareth-7 (and) steareth-10 |
| 0-20% | silicone conditioning agents (co-adjuvants) |
| 0-10% | cetrimonium chloride (25-35%) |
| 0-3% | guar hydroxypropyltrimonium chloride |
| 0-5% | dimethicone |
| 0-5% | paraffin oil |
| 1-10% | stearyl alcohol |
| 0-10% | glycerol |
| 0.01-1% | phenoxyethynol (and) methylparaben (and) butylparaben (and) ethylparaben (and) propylparaben |
| 0-1% | perfume (fragrance) |
| 0-1% | dyestuffs |
| 0-1% | citric acid |
| 0-2% | sodium chloride |
| to 100% | topped up by water. |

A quite specific hair care treatment, which does not, however, limit the invention, comprises the following constituents in % by wt.:

| | |
|---|---|
| 2-5% | polycarbonate- and/or polyurethane-polyorganosiloxane compounds according to the invention (as a 43.5% strength emulsion in water with nonionic emulsifiers) |
| 0-5% | silicone conditioning agents (co-adjuvants) |
| 0-2% | cetrimonium chloride (25-35%) |
| 0.5-5% | glycerol |
| 0.25-2.5% | propylene glycol |
| 0.05-0.2% | perfume |
| 0.1-0.5% | polysorbate 20 |
| to 100% | topped up by water. |

A typical dyestuffs-containing formulation according to the invention, which does not, however, limit the invention, for temporary, semipermanent or permanent hair colouring, care and conditioning of hair comprises the following constituents in % by wt.:

| | |
|---|---|
| 0.1-10% | polycarbonate- and/or polyurethane-polyorganosiloxane compounds according to the invention |
| 1-10% | hair dyestuff precursors or dyestuffs according to the desired hair colour |
| 0-15% | anionic surfactant |
| 0-10% | amphoteric surfactant |
| 0-10% | nonionic surfactant |
| 0-10% | cationic surfactant |
| 0-1% | sodium sulfite |
| 0-5% | buffer |
| 0-10% | silicone conditioning agents (co-adjuvants) |
| 0-10% | auxiliary substances |
| to 100% | water. |

A specific colour cream according to the invention, which does not, however, limit the invention, for permanent hair colouring comprises the following constituents in % by wt.:

| | |
|---|---|
| 0.1-10% | polycarbonate- and/or polyurethane-polyorganosiloxane compounds according to the invention (as a 20% strength emulsion in water with nonionic emulsifiers) |
| 1-5% | hair colour precursors or dyestuffs according to the desired hair colour |
| 2-15% | anionic surfactant |
| 0-10% | amphoteric surfactant |
| 0-10% | nonionic surfactant |
| 0-10% | cationic surfactant |
| 0.1-1% | sodium sulfite |
| 0.1-5% | buffer for pH = 8-12 |
| 0-10% | silicone conditioning agents (co-adjuvants) |
| 0-10% | auxiliary substances |
| to 100% | water. |

A specific colour solution according to the invention, which does not, however, limit the invention, for permanent hair colouring comprises the following constituents in % by wt.:

| | |
|---|---|
| 0.1-10% | polycarbonate- and/or polyurethane-polyorganosiloxane compounds according to the invention (as a 20% strength emulsion in water with nonionic emulsifiers) |
| 1-5% | hair colour precursors or dyestuffs according to the desired hair colour |
| 0.1-1% | sodium sulfite |
| 5-15% | propylene glycol |
| 5-15% | ammonia (28%). |
| 10-30% | oleic acid |
| 5-15% | isopropanol |
| 10-30% | alkanolamide |
| 0-10% | silicone conditioning agents (co-adjuvants) |
| to 100% | water. |

A typical developer formulation according to the invention, which does not, however, limit the invention, for permanent hair colouring comprises the following constituents in % by wt.:

| | |
|---|---|
| 0.1-10% | polycarbonate- and/or polyurethane-polyorganosiloxane compounds according to the invention |
| 10-30% | hydrogen peroxide (30%) |
| 0-15% | anionic surfactant |
| 0-10% | amphoteric surfactant |
| 0-10% | nonionic surfactant |
| 0-10% | cationic surfactant |
| 0-5% | buffer or acid for pH = 2-6 |
| 0-10% | silicone conditioning agents (co-adjuvants) |
| 0-10% | auxiliary substances |
| to 100% | water |

A specific developer cream according to the invention, which does not, however, limit the invention, for permanent hair colouring comprises the following constituents in % by wt.:

| | |
|---|---|
| 0.1-5% | polycarbonate- and/or polyurethane-polyorganosiloxane compounds according to the invention (as a 20% strength emulsion in water with nonionic emulsifiers) |
| 10-30% | hydrogen peroxide (30%) |
| 0-5% | silicone conditioning agents (co-adjuvants) |
| 1-10% | cetearyl alcohol |
| 0.5-5% | trideceth-2 carboxamide MEA |
| 0.5-5% | ceteareth-30 |
| 0.5-5% | glycerol |
| 0.05-2% | pentasodium pentetate (pentasodium diethylenetriamine-pentaacetate |
| 0.05-2% | sodium stannate |
| 0.05-2% | tetrasodium pyrophosphate |
| to 100% | water. |

It has been found here that the solutions or mixtures according to the invention are preferably suitable for the preparation of cosmetic formulations, such as for the treatment, conditioning, cleansing and/or care of coloured substrates or substrates which are to be coloured.

That is to say, the formulations containing at least one polycarbonate- and/or polyurethane-polyorganosiloxane compound according to the invention can be employed in particular for cleansing, care and conditioning of fibrous or planar substrates and if these are coloured and the colour impression thereof is to be largely retained.

The formulations containing at least one polycarbonate-and/or polyurethane-polyorganosiloxane compound according to the invention can furthermore serve for the cleansing, care and the treatment and the conditioning of keratin-containing substrates, since they are suitable as cleansing compositions for wool, for waxes and/or increasing the volume and/or the combability and/or the shine and/or for reducing the washing out of colour from and out of keratin-containing substrates which are coloured or from keratin-containing substrates which are simultaneously to be coloured, such as e.g. human and animal hair.

The formulations containing at least one polycarbonate-and/or polyurethane-polyorganosiloxane compound according to the invention can furthermore be used in particular for the cleansing, care and the treatment, cleansing and care of keratin-containing fibres or hair before, during and/or after the colouring operation, since the hair colouring compositions formulated with these lead simultaneously to an improvement in the softness and/or to a reduction in the wet and dry combing forces and/or to an increase in the shine and/or to an increase in the hair volume and/or to a reduction in the washing out of dyestuffs from and out of tinted and coloured hair.

Softener Formulations

With respect to the presentation form, on the one hand it is possible to incorporate the polycarbonate- and/or polyurethane-polyorganosiloxane compounds according to the invention into non-transparent softener dispersions or softener emulsions or transparent microemulsions or solutions.

Typical further components for such non-transparent or transparent formulations are:

quaternary ammonium compounds, preferably quaternary ammonium compounds containing alkanoic acid ester units as softeners, organic solvents, preferably mono- and polyhydric alcohols, such as ethanol, 2-propanol, ethylene glycol, 1,2-propylene glycol, hexylene glycol, dipropylene glycol, esters and ethers of glycols and oligoglycols, such as dipropylene glycol monobutyl ether, tripropylene glycol monomethyl ether, diethylene glycol diacetate, to improve the solubility and transparency of the formulation, diols and higher alcohols of longer-chain hydrocarbons, for example 2,2,4-trimethyl-1,3-pentanediol, to increase the solubilizability of the softener components, nonionic surfactants, preferably alkoxylates of branched or unbranched $C_8$ to $C_{40}$ alcohols and fatty acid esters of alkylene oxides, for stabilizing emulsions or preparation of microemulsions perfumes viscosity regulators dyestuffs preservatives.

The additional functional components listed and preferred representatives are known, for example, from U.S. Pat. No. 6,376,455.

On the other hand, it is possible to apply the polycarbonate- and/or polyurethane-polyorganosiloxane compounds according to the invention to solid carriers in the context of laundry freshener systems, and then to bring these into contact, in the laundry dryer, with textiles which are to be freshened and/or softened. Laundry freshener systems on carriers and functional components thereof are known, for example, from U.S. Pat. No. 4,824,582, U.S. Pat. No. 4,808,086, U.S. Pat. No. 4,756,850, U.S. Pat. No. 4,749,596 and U.S. Pat. No. 3,686,025.

Typical components for such laundry freshener systems on carriers are:
- fatty amines or complexes thereof with anionic surfactants, as conditioning agents
- quaternary ammonium compounds, preferably quaternary ammonium compounds containing alkanoic acid ester units, as softeners,
- nonionic softeners, for example based on sorbitan esters, fatty alcohol alkoxylates
- "soil release agents", for example based on cellulose ethers, guar gum, terephthalic acid block copolymers.

The carrier material is a sponge-like or porous sheet-like material which has a sufficient capacity for uptake of the laundry freshener formulation. "Woven" and "nonwoven" materials are employed. The materials are based on natural or synthetic polymers, such as wool, cotton, sisal, linen, cellulose esters, polyvinyl compounds, polyolefins, polyamides, polyurethanes and polyesters.

The invention furthermore relates to a reactive composition comprising at least one compound of the formula (10)

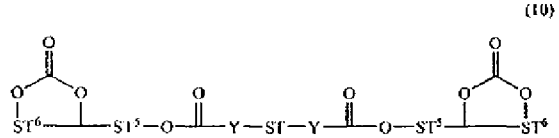

(10)

wherein ST is $ST^1$ or $ST^2$, which are as defined above, and Y is $Y^1$ or $Y^2$, which are as defined above, and $ST^5$ and $ST^6$ are as defined above,
and at least one compound of the formula

H—Y-ST-Y—H, wherein $ST=ST^1$ or $ST^2$, which are as defined above, and Y is as defined above,
with the proviso that at least one of the radicals ST comprises a polyorganosiloxane radical, In a preferred embodiment of the reactive composition of the invention, $Y=NR^2$, wherein $R^2$ is as defined above, preferably hydrogen, and $ST^5$ and $ST^6$ are each —$CH_2$—.

The invention furthermore relates to a reactive composition comprising at least one compound of the formula (13)

(13)

wherein $ST^5$, $ST^6$, $Y^1$ and $ST^1$ are as defined above, at least one compound of the formula

wherein $ST^3$, $Y^2$ and $R^5$ are as defined above, and at least one compound of the formula

Q-$ST^4$—Q.

wherein Q is a radical which is capable of alkylation of an amino group and $ST^{4'}$, together with the molecular part originating from Q after the quaternization reaction, forms the radical $ST^4$,
with the proviso that at least one of the radicals $ST^1$, $ST^3$ and/or $ST^4$ comprises a polyorganosiloxane radical.

In the abovementioned reactive composition, $ST^5$ and $ST^6$ are each preferably —$CH_2$—, $Y^1$ and $Y^2$ are preferably independently of each other $NR^2$, wherein $R^2$ is as defined above, preferably hydrogen.

The invention furthermore relates to a cured composition which is obtained by curing the reactive compositions described above. In this procedure, a coating and elastomeric shaped article can be formed in particular.

The cured compositions mentioned can be cured in particular by heating and/or addition of a catalyst. In this context, the reactive compositions can be employed in particular as a 1C (component) composition or, less preferably, as a 2C (component) composition.

The invention furthermore relates to the novel compound of the formula (12)

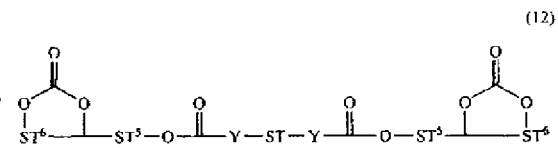

(12)

wherein ST is $ST^1$ or $ST^2$, which are as defined above, and Y is $Y^1$ or $Y^2$, which are as defined above, and $ST^5$ and $ST^6$ are as defined above,
with the proviso that the radical ST comprises at least one polyorganosiloxane radical, which can be used in the reactive compositions.

In the said compound, ST is preferably $ST^1$, which is as defined above, $ST^5$ and $ST^6$ are each preferably —$CH_2$—, Y is preferably $Y^1$, which is preferably $NR^2$, wherein $R^2$ is as defined above, preferably hydrogen.

By the use of such more highly functionalized compounds in which ST is in particular a tri- or tetravalent radical, branching/crosslinking of the polycarbonate- and/or polyurethane-polyorganosiloxane compound takes place. Various use parameters, such as e.g. hardness and elasticity, can be established in particular by this route.

The present invention is illustrated further by the following examples.

EXAMPLES

Example 1

5.2 g (0.022 mol) of a phenol ester of the structure

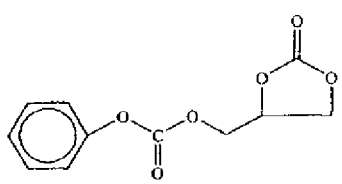

49 g of an aminosiloxane of the structure

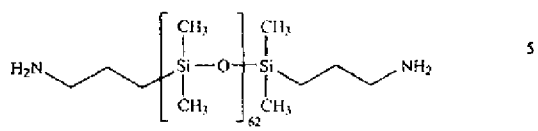

and 15 g of 1-butanol are mixed in a flask under an N$_2$ atmosphere and the mixture is heated at 120° C. for 9 hours, during which it reacts, with phenol being split off, to give a reaction mixture which contains the compound of the formula:

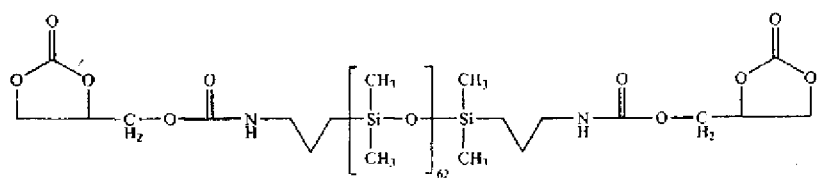

2.04 g (0.02 mol) of H$_2$NCH$_2$CH$_2$CH$_2$N(CH$_3$)$_2$ are then added and the mixture is heated at 120° C. for a further 9 hours.

Finally, 2.59 g (0.01 mol) of an ester of the structure

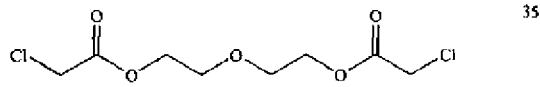

are added dropwise and the mixture is stirred at 120° C. for a further 18 hours.

As a result of the reaction, in addition to the phenol as the product split off, a polymer is obtained which contains the following structural element:

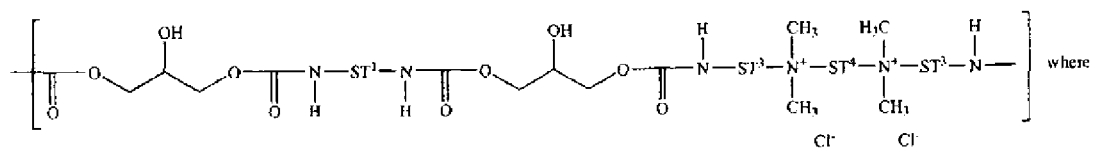 where

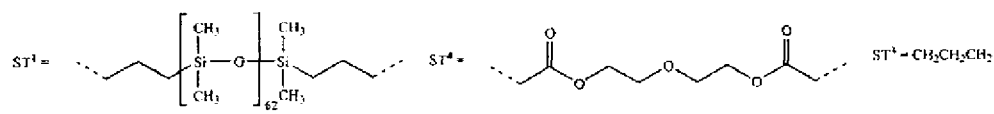

Example 2

7.36 g (8.04 mmol) of a carbonate-terminated polyalkylene oxide derivative of the structure

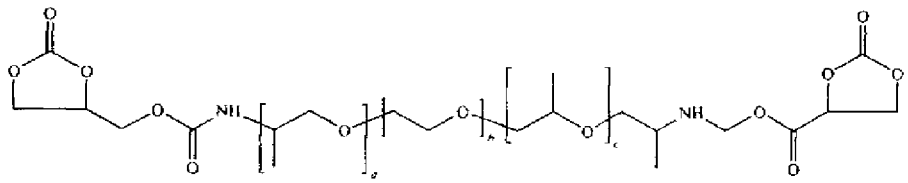

where a+c=3.6 and b=9,
prepared from

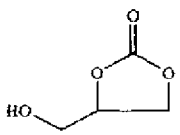

$COCl_2$ and Jeffamin ED 600 (Huntsman Corp.), 1.69 g (16.1 mmol) of $H_2NCH_2CH_2CH_2N(CH_3)_2$ and 61 g of propylene glycol monomethyl ether are initially introduced into a flask under an $N_2$ atmosphere and the mixture is heated at 116-118° C. for 15 hours, while stirring.

A mixture comprising 50 g (8.04 mmol) of an epoxysiloxane of the structure

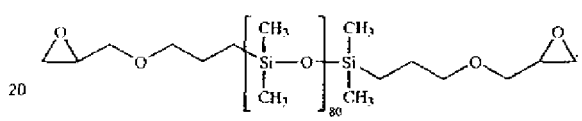

1 g of deionized water and 0.97 g (16.1 mmol) of acetic acid is then added. The total mixture is heated at 116-120° C. for 10 hours.

As a result of the reaction, a polymer is obtained which contains the following structural element:

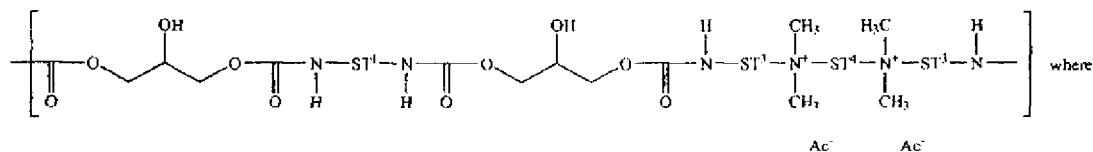

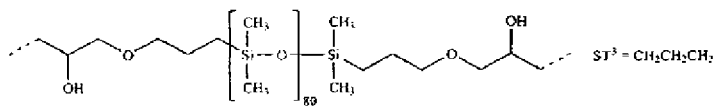

The polymers according to Examples 1 and 2 can be incorporated in an amount of 0.5-3% into pulverulent and liquid detergents based on anionic and/or nonionic surfactants, and exert there in particular their softening action on the fibre materials to be cleaned.

The invention claimed is:

1. A polycarbonate- and/or polyurethane-polyorganosiloxane compound containing at least one structural element of the formula (1):

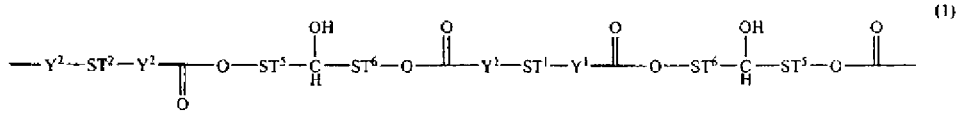

wherein
$Y^1$ and $Y^2$ are independently chosen from —O—, —S— and —NR$^2$—, wherein
  $R^2$ is hydrogen or a straight-chain, cyclic or branched, saturated, unsaturated or aromatic hydrocarbon radical having up to 40 carbon atoms, which can contain one or more groups chosen from —O—, —C(O)—, —NH— and —NR$^3$—, wherein $R^3$ is a straight-chain, cyclic or branched, saturated, unsaturated or aromatic hydrocarbon radical having up to 40 carbon atoms, which can contain one or more groups chosen from —O—, —C(O)— and —NH—, and
$ST^1$ and $ST^2$ are independently chosen from divalent to more than divalent, straight-chain, cyclic or branched, saturated, unsaturated or aromatic, substituted or unsubstituted hydrocarbon radicals having up to 1,000 carbon atoms, which can contain one or more groups chosen from —O—, —C(O)—, —NH—, —NR$^3$—,

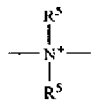

and a polyorganosiloxane unit having 2 to 1,000 silicon atoms, wherein
  $R^5$ is a straight-chain, cyclic or branched, saturated, unsaturated or aromatic hydrocarbon radical having up to 100 carbon atoms, which can contain one or more groups chosen from —O—, —C(O)— and —NH—, or $R^5$ is a divalent radical which forms cyclic structures within the radicals $ST^1$ and $ST^2$,
  or one or both of the radicals $Y^1$ adjacent to $ST^1$, with $ST^1$, and/or one or both of the radicals $Y^2$ adjacent to $ST^2$, with $ST^2$, can in each case form a nitrogen-containing heterocyclic radical, and
  wherein if a plurality of radicals $ST^1$ is present, these can be identical or different, and if a plurality of radicals $ST^2$ is present, these can be identical or different,
$ST^5$ is an optionally substituted, divalent, straight-chain, cyclic or branched, saturated or unsaturated hydrocarbon radical having 1 to 12 carbon atoms,
$ST^6$ is an optionally substituted, divalent, straight-chain, cyclic or branched, saturated or unsaturated hydrocarbon radical having 1 to 12 carbon atoms,
with the proviso that $ST^1$ comprises a polyorganosiloxane radical, and wherein
$ST^2$ represents a radical of the formula

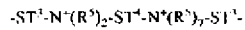

wherein
$ST^3$ is a straight-chain or cyclic or branched, saturated or unsaturated or aromatic, substituted or unsubstituted hydrocarbon radical having to 2 to 100 carbon atoms, which can be substituted by —O—, —C(O)—, —NH—, —NR$^3$—, wherein $R^3$ is as defined above, and
$ST^4$ is a straight-chain or cyclic or branched, saturated or unsaturated or aromatic, substituted or unsubstituted hydrocarbon radical having to 2 to 100 carbon atoms, which can be substituted by —O—, —C(O)—, —NH—, —NR$^3$— and by a polyorganosiloxane unit having 2 to 200 silicon atoms, wherein $R^3$ is as defined above,
or acid addition compounds and/or salts thereof of the compound of formula (1).

2. The compound of claim 1, wherein $ST^5$ and $ST^6$ are each —CH$_2$—, so that the formula (1) has the following structure:

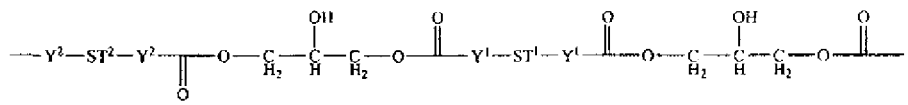

wherein
$Y^1$, $ST^1$ and $ST^2$ are as defined above.

3. The compound of claim 1, wherein the compound is linear and wherein $ST^1$ and $ST^2$ are in each case divalent radicals.

4. The compound of claim 1, wherein the compound is branched, and wherein at least one of the radicals $ST^1$ or $ST^2$ is tri- or tetravalent.

5. The compound of claim 1, further comprising at least one polyorganosiloxane structural element of the formula (2):

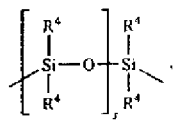

wherein
$R^4$ is a straight-chain, cyclic or branched, saturated, unsaturated or aromatic hydrocarbon radical having up to 20 C atoms, and
s=1 to 999.

6. The compound of claim 1, wherein the compound comprises at least two structural elements of the formula (1).

7. The compound of claim 1, wherein the compound comprises at least two polyorganosiloxane structural elements of the formula (2):

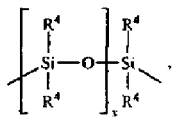

wherein $R^4$ is a straight-chain, cyclic or branched, saturated, unsaturated or aromatic hydrocarbon radical having up to 20 C atoms, and s=1 to 999.

8. The compound of claim 1, wherein $Y^1$=—NR—, and wherein $R^2$ is as defined above.

9. The compound of claim 1, wherein $Y^1$ and $Y^2$=—NR$^2$—, and wherein $R^2$ is as defined above.

10. The compound of claim 1, wherein $Y^1$ and $Y^2$=—NH—.

11. The compound of claim 1, wherein the compound is linear and wherein $ST^1$ is the same as $ST^2$ and these are in each case divalent.

12. The compound of claim 1, wherein $ST^1$ is different from $ST^2$.

13. The compound of claim 1, wherein $ST^1$ is

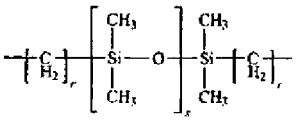

wherein s is 1 to 199, and r=1 to 12.

14. The compound of claim 1, having the following formula:

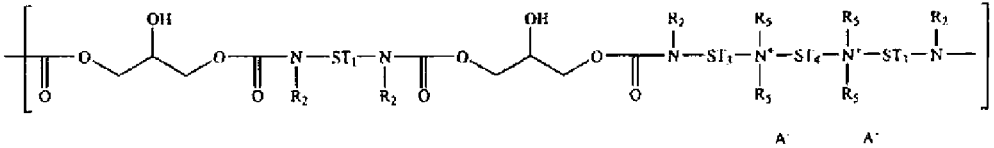

wherein $A^-$ is an organic or inorganic anion, with the proviso that at least one of the radicals $ST^1$, $ST^3$ and $ST^4$ contains a polyorganosiloxane unit.

15. The compound of claim 1, wherein $ST^1$ is selected from the group consisting of:

divalent, straight-chain hydrocarbon radicals having up to 15 carbon atoms, divalent, mono- or polycyclic hydrocarbon radicals having up to 15 carbon atoms, divalent, aromatic hydrocarbon radicals having up to 15 carbon atoms, and radicals which are divalent or more than divalent and are derived from primary and secondary amino-functionalized prepolymers.

16. A method of preparing a composition useful as coatings, agents for modification of surfaces, elastomers, thermosets, adhesives, primers for metal and plastics surfaces, polymer additives, detergent additives, rheological agents, cosmetics and agents for modification of fibres, the method including providing the compound of claim 1.

17. A formulation comprising at least one compound according to claim 1, the formulation useful as a detergent, cosmetic or fiber treatment.

18. A polycarbonate- and/or polyurethane-polyorganosiloxane compound containing at least one structural element of the formula (1):

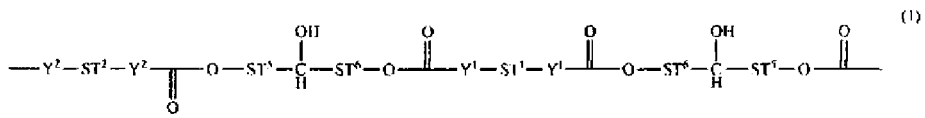

wherein $Y^1$ and $Y^2$ are independently chosen from —O—, —S— and —NR$^2$—, wherein $R^2$ is hydrogen or a straight-chain, cyclic or branched, saturated, unsaturated or aromatic hydrocarbon radical having up to 40 carbon atoms, which can contain one or more groups chosen from —O—, —C(O)—, —NH— and —NR$^3$—, wherein $R^3$ is a straight-chain, cyclic or branched, saturated, unsaturated or aromatic hydrocarbon radical having up to 40 carbon atoms, which can contain one or more groups chosen from —O—, —C(O)— and —NH—, and $ST^1$ and $ST^2$ are independently chosen from divalent to more than divalent, straight-chain, cyclic or branched, saturated, unsaturated or aromatic, substituted or unsubstituted hydrocarbon radicals having up to 1,000 carbon atoms, which can contain one or more groups chosen from —O—, —C(O)—, —NH—, —NR$^5$—,

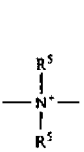

and a polyorganosiloxane unit having 2 to 1,000 silicon atoms, wherein $R^5$ is a straight-chain, cyclic or branched, saturated, unsaturated or aromatic hydrocarbon radical having up to 100 carbon atoms, which can contain one or more groups chosen from —O—, —C(O)— and —NH—, or $R^5$ is a divalent radical which forms cyclic structures within the radicals $ST^1$ and $ST^2$, or one or both of the radicals $Y^1$ adjacent to $ST^1$, with $ST^1$, and/or one or both of the radicals $Y^2$ adjacent to $ST^2$, with $ST^2$, can in each case form a nitrogen-containing heterocyclic radical, and wherein if a plurality of radicals $ST^1$ is present, these can be identical or different, and if a plurality of radicals $ST^2$ is present, these can be identical or different, $ST^5$ is an optionally substituted, divalent, straight-chain, cyclic or branched, saturated or unsaturated hydrocarbon radical having 1 to 12 carbon atoms, $ST^6$ is an optionally substituted, divalent, straight-chain, cyclic or branched, saturated or unsaturated hydrocarbon radical having 1 to 12 carbon atoms, wherein $ST^1$ represents a radical which contains a polyalkylenoxy group and $ST^2$ represents a radical which contains a polyorganosiloxane group.

19. The compound of claim 18, wherein the compound comprises at least one selected from the group consisting of amino groups, protonated amino groups and quaternary ammonium groups.

20. A formulation comprising at least one compound according to claim 18, the formulation useful as a detergent, cosmetic or fiber treatment.

21. A method of preparing a composition useful as coatings, agents for modification of surfaces, elastomers, thermosets, adhesives, primers for metal and plastics surfaces, polymer additives, detergent additives, rheological agents, cosmetics and agents for modification of fibers, the method including providing the compound of claim 18.

* * * * *